US009553521B2

(12) United States Patent
Yonezawa et al.

(10) Patent No.: US 9,553,521 B2
(45) Date of Patent: Jan. 24, 2017

(54) POWER SUPPLY DEVICE AND CONTROL METHOD OF POWER SUPPLY DEVICE

(71) Applicant: FUJITSU LIMITED, Kawasaki-shi, Kanagawa (JP)

(72) Inventors: Yu Yonezawa, Sagamihara (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 40 days.

(21) Appl. No.: 14/618,482

(22) Filed: Feb. 10, 2015

(65) Prior Publication Data

US 2015/0155792 A1    Jun. 4, 2015

Related U.S. Application Data

(63) Continuation of application No. PCT/JP2012/071907, filed on Aug. 29, 2012.

(51) Int. Cl.
*H02M 3/335* (2006.01)
*H02M 3/337* (2006.01)

(52) U.S. Cl.
CPC ..... *H02M 3/33546* (2013.01); *H02M 3/33592* (2013.01); *H02M 3/3376* (2013.01); *Y02B 70/1475* (2013.01)

(58) Field of Classification Search
CPC .................................................. H02M 3/335
See application file for complete search history.

(56) References Cited

U.S. PATENT DOCUMENTS

| 5,991,171 A * | 11/1999 | Cheng .............. H02M 3/33507 363/21.03 |
| 6,198,644 B1 | 3/2001 | Minamisawa |
| 6,384,579 B2 * | 5/2002 | Watanabe ..................... 320/166 |
| 7,889,517 B2 * | 2/2011 | Artusi ................. H02M 1/4225 363/16 |
| 8,964,414 B2 * | 2/2015 | Kojima ............. H02M 3/33576 363/17 |

(Continued)

FOREIGN PATENT DOCUMENTS

| JP | 2000-83377 | 3/2000 |
| JP | 2001-78444 | 3/2001 |

(Continued)

OTHER PUBLICATIONS

International Search Report mailed Nov. 6, 2012, in corresponding International Patent Application No. PCT/JP2012/071907.

(Continued)

*Primary Examiner* — Emily P Pham
(74) *Attorney, Agent, or Firm* — Staas & Halsey LLP

(57) ABSTRACT

First FET switches control supply of electricity from an external power supply to a primary winding of a transformer. A condenser is connected, in series, to a secondary winding of the transformer. A second FET switch is connected, in parallel, to the secondary winding and the condenser. The diode is connected, in parallel, to the second FET switch. A switch control unit acquires a value obtained by measuring a current flowing through the first FET switches and the second FET switch and controls, on the basis of the measurement result of the current, conduction of the first FET switches and the second FET switch.

11 Claims, 16 Drawing Sheets

(56) References Cited

U.S. PATENT DOCUMENTS

| | | | |
|---|---|---|---|
| 2001/0026462 A1 | 10/2001 | Tokunaga et al. | |
| 2005/0152158 A1* | 7/2005 | Gut | H02M 3/33592 363/16 |
| 2009/0257250 A1* | 10/2009 | Liu | H02M 3/33592 363/21.06 |
| 2012/0299565 A1* | 11/2012 | Zhang | H02M 3/1588 323/282 |

FOREIGN PATENT DOCUMENTS

| | | |
|---|---|---|
| JP | 2001-275348 | 10/2001 |
| JP | 2007-151271 | 6/2007 |
| JP | 2011-87407 | 4/2011 |
| JP | 2011-199972 | 10/2011 |
| JP | 2012-65397 | 3/2012 |

OTHER PUBLICATIONS

Written Opinion of the International Search Authority mailed Nov. 6, 2012, in corresponding International Patent Application No. PCT/JP2012/071907.

* cited by examiner

410

| | |
|---|---|
| OFF TIME OF SWITCH 1 | 4.5 [ns] |
| GATE DELAY OF ON STATE SWITCH 1 | 10 [ns] |
| GATE DELAY OF OFF STATE SWITCH 1 | 67 [ns] |
| OFF TIME OF SWITCH 4 | 4.5 [ns] |
| GATE DELAY OF ON STATE SWITCH 4 | 10 [ns] |
| GATE DELAY OF OFF STATE SWITCH 4 | 67 [ns] |

POWER SUPPLY DEVICE AND CONTROL METHOD OF POWER SUPPLY DEVICE

CROSS-REFERENCE TO RELATED APPLICATION

This application is a continuation of International Application No. PCT/JP2012/071907, filed on Aug. 29, 2012, the entire contents of which are incorporated herein by reference.

FIELD

The embodiments discussed herein are directed to a power supply device and a control method of the power supply device.

BACKGROUND

In power supply devices, there may be a case in which direct current to direct current (DC-DC) converters are used to decrease a voltage. For example, with battery chargers for mobile phones or alternating current (AC) adapters for notebook computers, an input alternating voltage of 100 V is converted to a DC voltage and, then, the DC voltage is decreased by the DC-DC converter and electrical power is supplied.

In particular, in power supply devices, such as battery chargers for mobile phones or AC adapters for personal computers, in which an input voltage is high and an output voltage is low, isolated forward converters may sometimes be used as DC-DC converters.

However, in circuits of single ended forward converters, because winding wires for releasing energy are provided, a great loss occurs in transformers. Accordingly, to reduce a loss of the transformers, double ended forward circuits in which two Field Effect Transistors (FETs) functioning as switching devices are arranged in the main transformers may sometimes be used. When the double ended forward circuits are used, because the winding wires for releasing energy are not provided, the loss of transformers can be reduced. Furthermore, with the power supply devices that use the double ended forward circuits, in order to improve the efficiency, synchronous rectifiers are connected, in parallel, to a secondary side diode.

FIG. 17 is a schematic diagram illustrating an example of a double ended forward circuit. In the following, a description will be given of the transition of the flow of electricity after the state in which switches 901 to 903 are turned on and the FET switch 904 is turned off.

When the FET switches 901 to 903 are turned on and the FET switch 904 is turned off, as illustrated by a dotted line 921, electricity flows via the switch 901 and the switch 902. Consequently, an induced current is generated and, as illustrated by a dotted line 923, electricity flows via the FET switch 903. The electricity is accumulated in a condenser and is output outside.

Then, by turning off the FET switches 901 to 903, electricity flows via a diode 911 and a diode 912 due to the energy accumulated in a primary coil, as illustrated by a dashed line 922. At this time, due to the energy accumulated in a secondary side choke coil, electricity flows via a diode 914 and the condenser. At this time, because the FET switch 904 is still in the off state, on the secondary side, electricity flows via the diode 914 as illustrated by a two-dot chain line 924. Furthermore, an induced current is generated due to the electricity flowing in the primary side coil and thus electricity flows. Because the flow direction of this electricity is the same direction as that illustrated by the two-dot chain line 924, which does not prevent the electricity flowing on the secondary side. However, in this state, a loss of electricity occurs when electricity flows via the diode 914. Accordingly, by turning on the FET switch 904 and electricity is made to flow via the FET switch 904. By doing so, because the electricity flows without passing through the diode 914, a loss is reduced.

At this point, if the FET switch 904 is turned on when the switch 901 and the switch 902 are in the on state, the drain current flows through both switches and thus a short circuit occurs. Accordingly, the FET switch 904 needs to be turned on after the switch 901 and the FET switch 902 are turned off.

Then, the switch 901 and the FET switch 902 are to be turned on; however, when the FET switches 901 and 902 and the FET switch 904 are simultaneously turned on, i.e., when drain current simultaneously flows in the FET switches 901 902 and the FET switch 904, a short circuit occurs. Accordingly, to prevent the short circuit, the FET switch 904 is turned off before the switch 901 and the FET switch 902 are turned on and then the FET switches 901 to 903 are turned on. In this case, if the FET switch 904 is turned off, electricity flows as illustrated by the two-dot chain line 924. Thereafter, because the FET switches 901 to 903 are turned on, electricity flows as illustrated by the dotted line 923.

Here, in FIG. 17, in order to easy to understand, a diode 913 and the diode 914 are arranged independent of the FET switch 903 and the FET switch 904. However, in general, a parasitic diode is installed inside each of the FET switch 903 and the FET switch 904 that are FET switches and, in practice, there may be a case in which the diode 913 and the diode 914 are not installed.

With the DC-DC converter that uses the double ended forward circuit illustrated in FIG. 17, if all of the FET switches 901 to 904 are in the off state, electricity flows via the diode 914 as illustrated by the two-dot chain line 924. If electricity flows via the diode 914 in this way, a loss of electricity occurs in the diode 914. For example, an electricity loss of 1 V occurs in both ends of the diode 914. Accordingly, it is preferable to shorten the time during which electricity flows into the diode 914. However, as described above, because a short circuit occurs when the FET switches 901 and 902 and the FET switch 904 are simultaneously turned on, a switch timing between the FET switch 904 and the FET switches 901 and 902 needs to differ. In this way, the time during which the drain current does not flow both the FET switch 904 and the FET switches 901 and 902 is referred to as a dead time. Because electricity flows via the diode during the dead time, a loss occurs. Furthermore, the dead time becomes the longest when no load is applied to a power supply. Accordingly, with the conventional power supply device, in order to reduce a loss as much as possible, a dead time at the time of no load is set to the minimum.

Furthermore, for DC-DC converters, a conventional technology that suppresses, when an output voltage becomes large, a rise in an output voltage by extending conduction period of a body diode is proposed. Furthermore, for DC-DC converters that alternately turn switches connected in series, a conventional technology that adjusts, in order to prevent through current, the switch timing when switches are turned on is adjusted in accordance with the property of the switches is proposed.

Patent Document 1: Japanese Laid-open Patent Publication No. 2007-151271

Patent Document 2: Japanese Laid-open Patent Publication No. 2011-199972

However, if a load current of a power supply becomes large, a drain current applied to each of FET switches that function as switching devices is increased and the interval of the FET switches to be turned on or off is increased. Accordingly, as with the conventional technology, if a dead time at the time of no load is set to the minimum, the dead time becomes long at the time of high current and thus a loss of electricity is increased.

FIG. 18 is a schematic diagram illustrating expansion of dead time when a high current flows. A graph 961 is a graph that represents a gate voltage of the FET switch 901 illustrated in FIG. 17. A graph 962 is a graph that represents a drain voltage of the FET switch 901. A graph 963 is a graph that represents a gate voltage of the FET switch 904 illustrated in FIG. 17. A graph 964 is a graph that represents a drain voltage of the FET switch 904. It is assumed that the FET switches 901 to 903 are simultaneously turned on or off. Furthermore, for the graphs 961 and 962, when an output is High, the state becomes in the on state, whereas, when an output is Low, the state becomes in the off state. Furthermore, it is assumed that, for the FET switches 901 to 904, if a drain voltage drops, a drain current flows.

At this time, the DC-DC converter is adjusted such that a dead time becomes the minimum when no load is applied and, as indicated by the solid lines illustrated in graphs 962 and 964, at a timing 941, the drain current of the FET switch 904 does not flow and the drain current of the FET switch 901 starts to flow. Furthermore, at a timing 942, the drain current of the FET switch 901 does not flow and the drain current of the FET switch 904 starts to flow.

However, if the drain current becomes large, the interval of the FET switches 901 and 904 to be turned on or off is increased as indicated by a dotted lines 931 to 934. Consequently, at a timing 943, the drain current of the FET switch 904 does not flow and a dead time is expanded as illustrated by a time period 951. Furthermore, at a timing 944, the drain current of the FET switch 901 does not flow and a dead time is expanded as illustrated by a time period 952.

Furthermore, with the conventional technology that changes conduction period of a body diode, shortening of a dead time is not considered; therefore, it is difficult to suppress a loss of electricity. Furthermore, with the conventional technology that adjusts the timing of a switch to be turned on in accordance with the property of the switch, a change in a dead time due to an increase in a current is not considered; therefore, it is also difficult to suppress a loss of electricity.

SUMMARY

According to an aspect of an embodiment, a power supply device includes: a first switching device that controls supply of electricity from an external power supply to a primary winding of a transformer; a condenser that is connected, in series, to a secondary winding of the transformer; a second switching device that is connected, in parallel, to the secondary winding and the condenser; a rectifying device that is connected, in parallel, to the second switching device; and a switch control unit that acquires a value obtained by measuring a current flowing through the second switching device and that controls, on the basis of the measurement result of the current, conduction of the first switching device and the second switching device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The power supply device and the control method of the power supply device disclosed in the present invention are not limited to the embodiments described below. In particular, in the following, a description will be given as an example of a power supply device mounted on a server; however, the power supply device is not limited thereto and a power supply device mounted on another apparatus may also be used.

[a] First Embodiment

Figure 1:
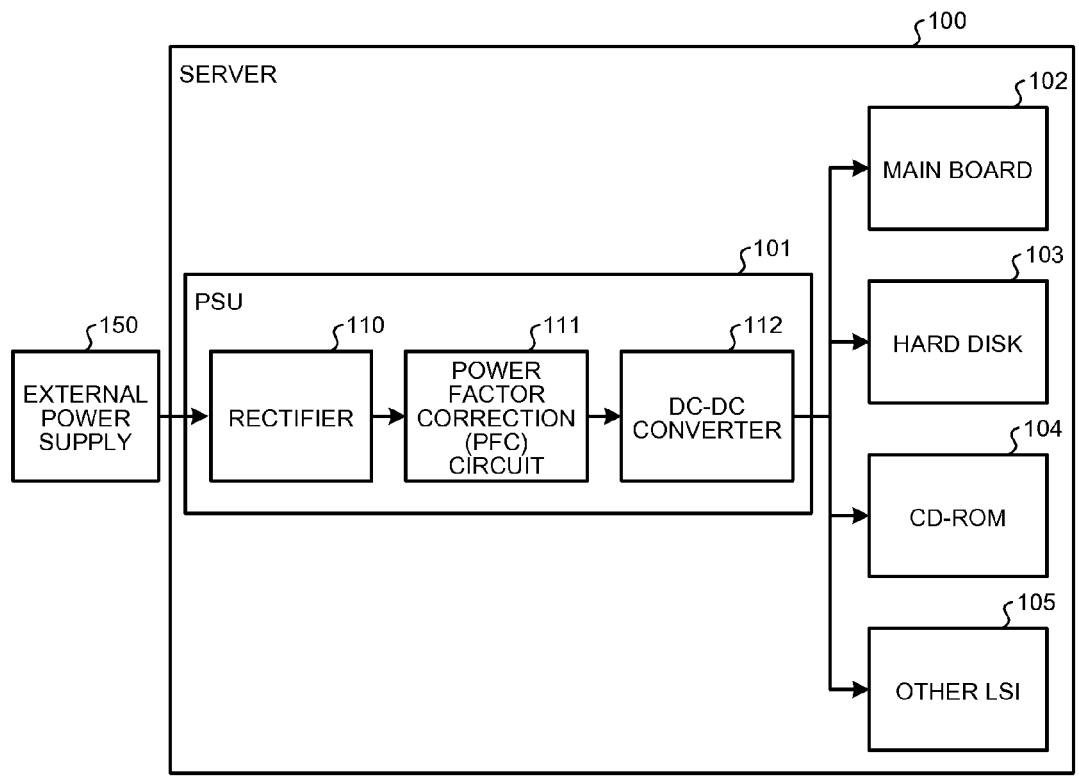
FIG. 1 is a block diagram illustrating a server in which a power supply device according to an embodiment is installed.

FIG. 1 is a block diagram illustrating a server in which a power supply device according to an embodiment is installed. As illustrated in FIG. 1, a server 100 includes a power supply unit (PSU) 101 that is a power supply device. Furthermore, the server 100 includes a main board 102 on which a central processing unit (CPU) or a memory are mounted, a hard disk 103, a compact disk read only memory (CD-ROM) 104, and another large scale integration (LSI) 105.

The PSU 101 includes a rectifier 110, a power factor correction (PFC) circuit 111, and a DC-DC converter 112.

An external power supply 150 is an electrical power supply source, such as a commercial power supply or the like. The external power supply 150 is connected to the rectifier 110 or the like mounted on the server 100. The external power supply 150 supplies alternating electricity to the rectifier 110.

The rectifier 110 receives an input of the alternating electricity from the external power supply 150. Then, the rectifier 110 converts the input alternating current to a direct current. Then, the rectifier 110 outputs the electricity in which the current is converted to the direct current to the power factor correction circuit 111.

The power factor correction circuit 111 receives an input of the electricity with the direct current from the rectifier 110. Then, the power factor correction circuit 111 improves the power factor by removing, for example, higher harmonics of the received electricity with the direct current. Thereafter, the power factor correction circuit 111 outputs the electricity with the direct current in which the power factor has been improved to the DC-DC converter 112.

The DC-DC converter 112 receives an input of the electricity with the direct current from the power factor correction circuit 111. Then, the DC-DC converter 112 decreases the voltage of the received electricity. Then, the DC-DC converter 112 supplies the electricity in which the direct current is decreased to the main board 102, the hard disk 103, the CD-ROM 104, the other LSI 105, or the like. The decrease in the voltage performed by the DC-DC converter 112 will be described in detail later.

The main board 102, the hard disk 103, the CD-ROM 104, and the other LSI 105 perform various processes by using electrical power supplied from the DC-DC converter 112.

Figure 2:
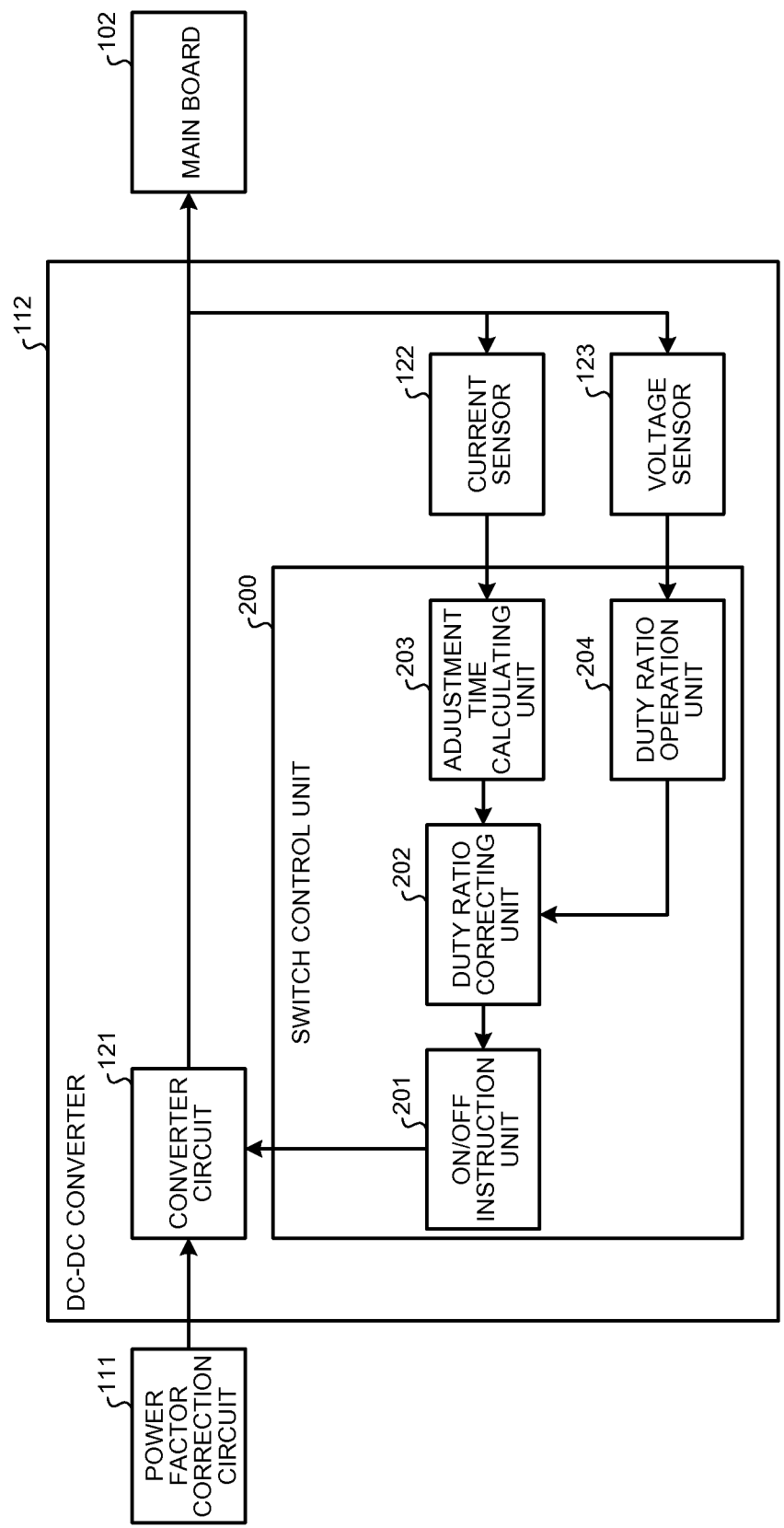
FIG. 2 is a block diagram illustrating a DC-DC converter according to a first embodiment.

FIG. 2 is a block diagram illustrating a DC-DC converter according to a first embodiment. As illustrated in FIG. 2, the DC-DC converter 112 includes a converter circuit 121, a current sensor 122, a voltage sensor 123, and a switch control unit 200.

Figure 3:
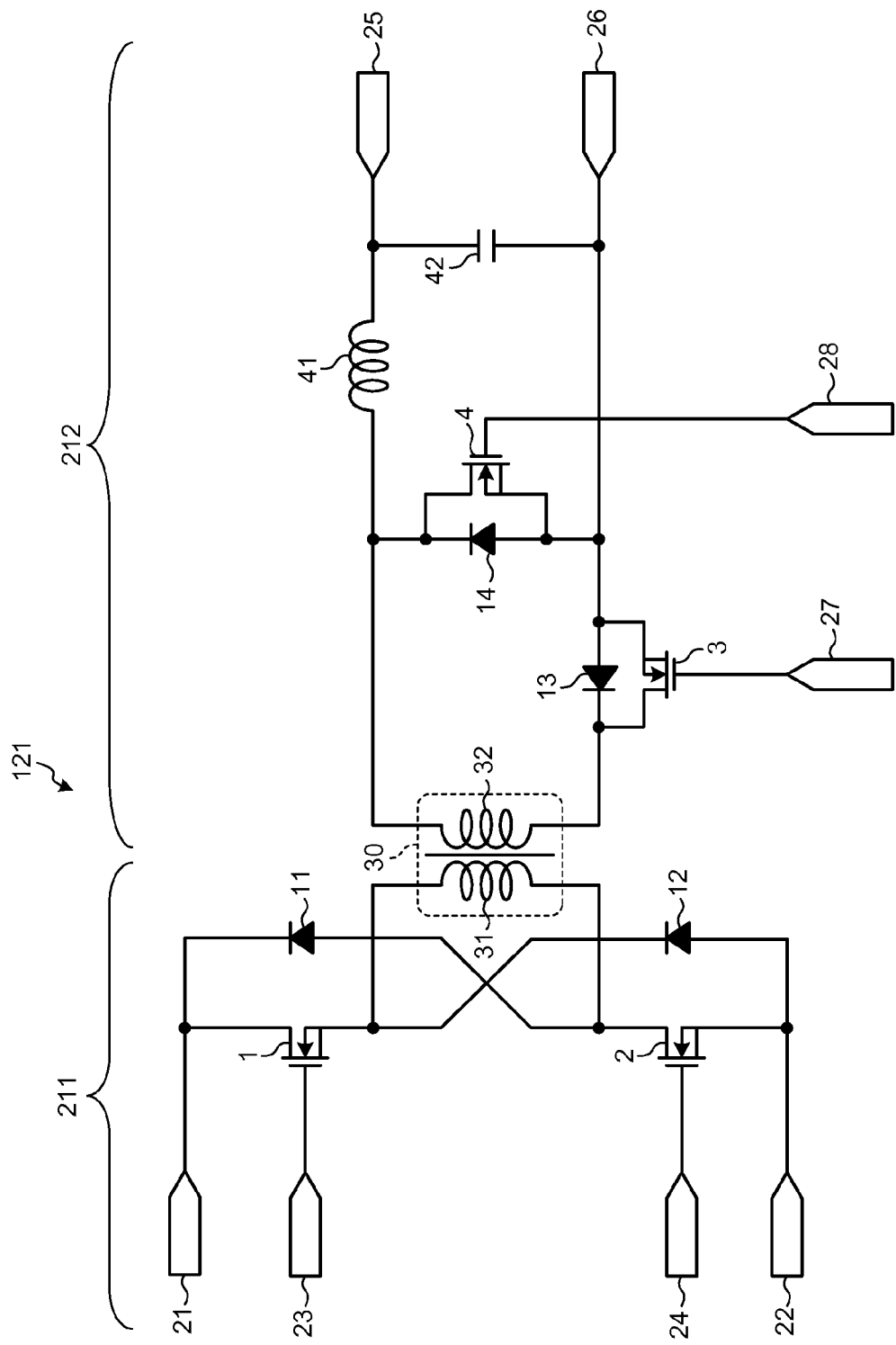
FIG. 3 is a circuit diagram illustrating in detail a converter circuit.

FIG. 3 is a circuit diagram illustrating a converter circuit in detail. The converter circuit 121 is a double ended forward circuit.

The converter circuit 121 includes a primary side circuit 211 and a secondary side circuit 212.

The primary side circuit 211 includes an FET switch 1, an FET switch 2, a diode 11, a diode 12, an input terminal 21, an output terminal 22, a gate voltage input terminal 23, a gate voltage input terminal 24, and a primary coil 31. Here, the FET switch 1 and the FET switch 2 are not limited to FET switches as long as a predetermined property is satisfied as switching devices. Furthermore, the diode 11 and the diode 12 are not limited to diodes as long as a predetermined property is satisfied as rectifying devices.

The input terminal 21 receives an input of electricity from the power factor correction circuit 111. The output terminal 22 outputs the electricity to the power factor correction circuit 111.

Between the input terminal 21 and the output terminal 22, the FET switch 1, the primary coil 31, and the FET switch 2 are arranged in series in the order they are listed in this sentence.

Furthermore, in the primary side circuit 211, an alternative path for the FET switch 1 that is used to connect a path between the FET switch 1 and the input terminal 21 and a path between the FET switch 2 and the primary coil 31 is provided. Then, on the alternative path for the FET switch 1, the diode 11 is provided such that electricity flows from the branch point of the FET switch 2 and the primary coil 31 to the branch point of the FET switch 1 and the input terminal 21.

Furthermore, in the primary side circuit 211, an alternative path for the FET switch 2 that is used to connect a path between the FET switch 1 and the primary coil 31 and a path between the FET switch 2 and the output terminal 22. Then, on the alternative path for the FET switch 2, the diode 12 is provided such that electricity flows from the branch point of the FET switch 2 and the output terminal 22 to the branch point of the FET switch 1 and the primary coil 31.

The gate voltage input terminals 23 and 24 receive an input of a gate voltage from the switch control unit 200. The gate voltage input terminal 23 is connected to the gate of the FET switch 1. Furthermore, the gate voltage input terminal 24 is connected to the gate of the FET switch 2.

The FET switch 1 is turned on when the gate voltage that is input from the gate voltage input terminal 23 is applied. Furthermore, the FET switch 1 is turned off when the gate voltage that is input from the gate voltage input terminal 23 is not applied.

The FET switch 2 is turned on when the gate voltage that is input from the gate voltage input terminal 24 is turned on. Furthermore, the FET switch 2 is turned off when the gate voltage from the gate voltage input terminal 24 is not applied.

The secondary side circuit 212 includes an FET switch 3, an FET switch 4, a diode 13, a diode 14, an output terminal 25, an input terminal 26, a gate voltage input terminal 27, a gate voltage input terminal 28, a secondary coil 32, a choke coil 41, and a condenser 42. The condenser 42 is a capacitor.

Between the output terminal 25 and the input terminal 26, the secondary coil 32, the diode 14, and the condenser 42 are connected in parallel. The diode 14 is arranged such that electricity is made to flow from the connection side of the input terminal 26 to the connection side of the output terminal 25. The diode 14 is an example of a rectifying device.

Furthermore, the FET switch 4 is provided in parallel with the diode 14. When the FET switch 4 is turned on, electricity does not flow in the diode 14, whereas, when the FET switch 4 is turned off, electricity flows in the diode 14.

Furthermore, the diode 13 is provided between the secondary coil 32 and the branch point of the diode 14 and the FET switch 4. The diode 13 is arranged such that electricity is made to flow from the connection side of the input terminal 26 to the connection side of the secondary coil 32.

Furthermore, the FET switch 3 is provided in parallel with the diode 13. When the FET switch 3 is turned on, electricity does not flow in the diode 13, whereas, when the FET switch 3 is turned off, electricity flows in the diode 13.

Furthermore, the choke coil 41 is provided between the output terminal 25 and the branch point of the diode 14 and the FET switch 4.

The primary coil 31 in the primary side circuit 211 and the secondary coil 32 in the secondary side circuit 212 form a transformer 30 that functions as a transformer. The electricity that is input from the input terminal 21 to the primary side circuit 211 is output from the output terminal 25 of the secondary side circuit 212 after the voltage of the electricity is decreased by the transformer 30.

When the FET switches 1 and 2 are turned on and the FET switch 4 is turned off, in the primary side circuit 211, the electricity that is input from the input terminal 21 is output from the output terminal 22 via the FET switch 1, the primary coil 31, and the FET switch 2. At this time, a back electromotive force occurs in the primary coil 31 and thus an induced electromotive force occurs in the secondary coil 32. The electricity generated from the induced electromotive force flows via the choke coil 41, the condenser 42, the FET switch 3, and the secondary coil 32 and is output from the output terminal 25. Furthermore, the electricity that is output from the output terminal 25 flows through devices, such as the main board 102 or the like, that uses electricity and is then input from the input terminal 26.

When the FET switches 1, 2, and 3 are in the off state from the on state, the electricity flowing through the primary coil 31 temporarily stops. Immediately after this, the FET switch 4 is still turned off. At this time, an electromotive force is generated from the energy accumulated in the choke coil 41. The electricity generated from the electromotive force flows via the condenser 42, the choke coil 41, and the diode 14 and is then output from the output terminal 25. This time period corresponds to a dead time. During this dead time, a loss occurs in the diode 14.

Thereafter, when the FET switch 4 is turned on, the electricity generated from the electromotive force in the choke coil 41 flows via the condenser 42, the choke coil 41, and the FET switch 4 and is output from the output terminal 25.

Furthermore, after elapse of a time, due to the energy accumulated in the primary coil 31, electricity flows from the output terminal 22 toward the input terminal 21 via the diode 12 and the diode 11. At this time, in the primary coil 31, because electricity flows in the same direction as that of the flow of electricity when the FET switches 1 and 2 are turned on, the back electromotive force is generated in the same direction as that of the flow of electricity when the FET switches 1 and 2 are turned on. Consequently, an induced electromotive force is generated in the secondary coil 32 and thus electricity flows through the secondary side circuit 212.

Furthermore, thereafter, before the FET switches 1, 2, and 3 are turned on again, the FET switch 4 is turned off. At this time, the electricity generated from the electromotive force in the choke coil 41 flows via the condenser 42, the choke coil 41, and the diode 14 and is then output from the output terminal 25. This time period also corresponds to a dead time.

Thereafter, when the FET switches 1, 2, and 3 are turned on, the state returns to the initial state.

A description will be given here by referring back to FIG. 2. The current sensor 122 measures the output current that is output from the converter circuit 121. Then, the current sensor 122 outputs the measurement result of the output current to the switch control unit 200.

The voltage sensor 123 measures an output voltage that is output from the converter circuit 121. Then, the voltage sensor 123 outputs the measurement result of the output voltage to the switch control unit 200.

The switch control unit 200 includes an on/off instruction unit 201, a Duty ratio correcting unit 202, an adjustment time calculating unit 203, and a Duty ratio operation unit 204.

The adjustment time calculating unit 203 receives an input of the measurement result of the output current in the converter circuit 121 from the current sensor 122. Then, the adjustment time calculating unit 203 performs analog/digital (A/D) conversion on the value of the received output current and acquires a digital value of the output current. Here, the output current from the converter circuit 121 is the same as the drain current that flows through in the FET switches 1 to 4. Accordingly, the adjustment time calculating unit 203 calculates, by using the output current, adjustment time for adjusting a dead time. In the following, calculation of adjustment time used to adjust a dead time obtained by the adjustment time calculating unit 203 will be described in detail.

Figure 4:
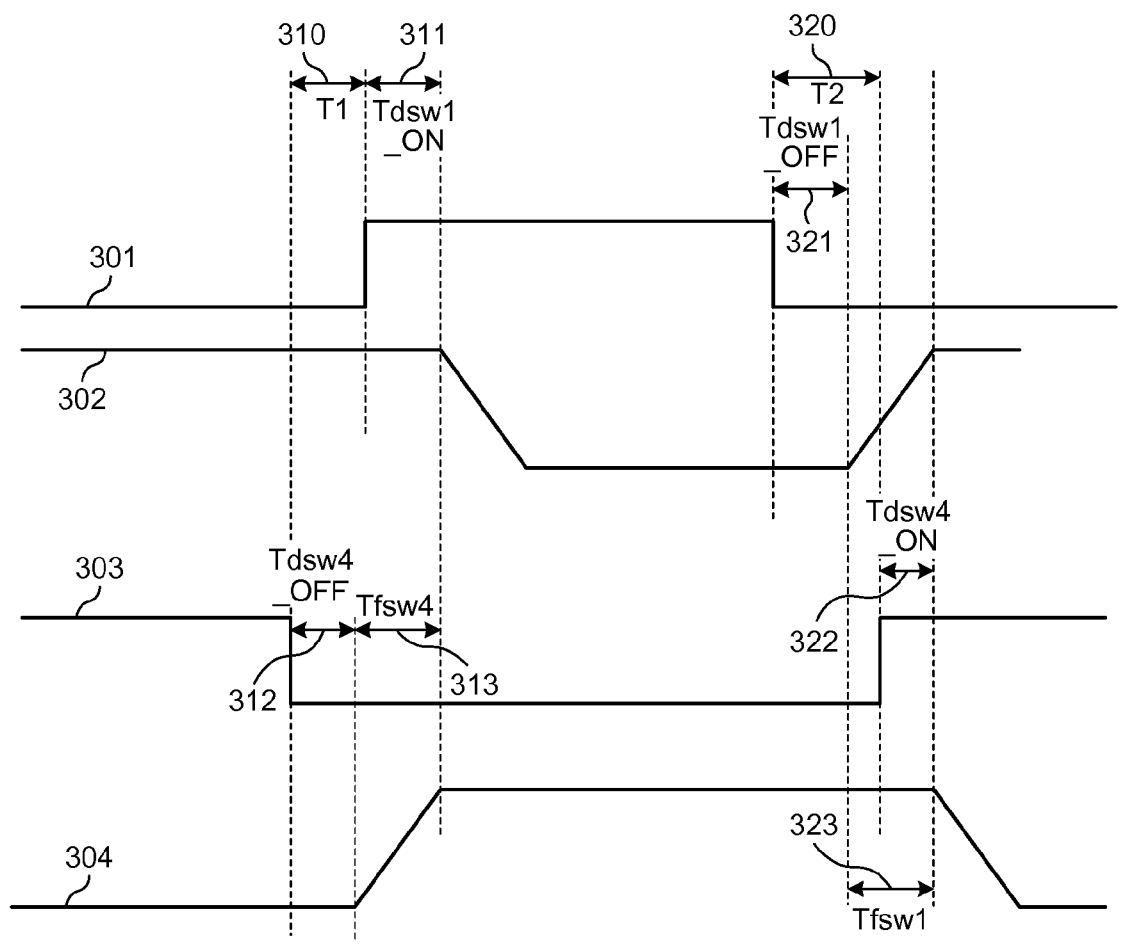
FIG. 4 is a schematic diagram illustrating calculation of adjustment time.

FIG. 4 is a schematic diagram illustrating calculation of adjustment time. A graph 301 is a graph that represents the gate voltage of the FET switch 1. A graph 303 is a graph that represents the gate voltage of the FET switch 4. In both the graphs 301 and 303, the horizontal axis represents the time and the vertical axis represents on/off. When the value indicated by the vertical axis in the graphs 301 and 303 is a High level, this state indicates that a voltage is applied to a switch, whereas, when the value is a Low level, this state indicates that a voltage is not applied to a switch. Furthermore, a graph 302 is a graph that represents the drain voltage of the FET switch 1. A graph 304 is a graph that represents the drain voltage of the FET switch 4. In both the graphs 302 and 304, the horizontal axis represents the time and the vertical axis represents a voltage. The FET switches 1 and 4 are turned on due to a drop in a drain voltage and the drain current flows.

Furthermore, the graphs 301 to 304 are illustrated such that, in the graph 302 and the graph 304, the drain voltage of the FET switch 1 is applied at the timing when the drain voltage of the FET switch 4 becomes zero. Furthermore, the graphs 301 to 304 are illustrated such that, in the graph 302 and the graph 304, the drain voltage of the FET switch 4 is applied at the timing when the drain voltage of the FET switch 1 becomes zero. Namely, the graphs 301 to 304 represent the state in which a dead time is the minimum. In other words, on/off control of the FET switches 1 and 4 is preferably performed such that the obtained states thereof are indicated by the graphs 301 to 304.

In this state, a time period 310 from when the FET switch 4 is turned off until when the FET switch 1 is turned on corresponds to a delay time. Here, the duration of the time period 310 is represented by T1. By turning on the FET switch 1 after T1 hour has elapsed after the FET switch 4 was turned off, it is possible to minimize a dead time. Furthermore, a time period 320 from when the FET switch 1 is turned off until when the FET switch 4 is turned on corresponds to a delay time. Here, the duration of the time period 320 is represented by T2. By turning on the FET switch 4 after T2 hour has elapsed after the FET switch 1 was turned off, it is possible to minimize a dead time.

Here, a time period 311 is the duration from when the gate voltage of the FET switch 1 is applied until when the drain voltage starts to be decreased (hereinafter, sometimes be referred to as a "gate delay of the FET switch 1 in an on state"). Hereinafter, the time period 311 is represented by Tdsw1_ON. Furthermore, a time period 312 is the duration from when the gate voltage of the FET switch 4 becomes in an off state until when the drain voltage is increased (hereinafter, sometimes be referred to as a "gate delay of the FET switch 4 in an off state"). Hereinafter, the time period 312 is represented by Tdsw4_OFF. Furthermore, a time period 313 is the duration from when the drain voltage of the FET switch 4 starts to increase until when a drain current stops to flow (hereinafter, sometimes be referred to as an "off time of the FET switch 4"). Hereinafter, the time period 313 is represented by Tfsw4.

In this case, T1 represents a value obtained by subtracting Tdsw1_ON from the sum of Tdsw4_OFF and Tfsw4. Namely, this can be represented by T1=Tdsw4_OFF+Tfsw4−Tdsw1_ON.

Furthermore, a time period 321 is the duration from when the gate voltage of the FET switch 1 becomes in an off state until when the drain voltage stats to be decreased (hereinafter, sometimes be referred to as a "gate delay of the FET switch 1 in an off state"). Hereinafter, the time period 321 is represented by Tdsw1_OFF. Furthermore, a time period 322 is the duration from when the gate voltage of the FET switch 4 becomes in an on state until when the drain voltage starts to be decreased (hereinafter, sometimes be referred to as a "gate delay of the FET switch 4 in an on state). Hereinafter, the time period 312 is represented by Tdsw4_ON. Furthermore, a time period 323 is the duration from when the drain voltage of the FET switch 1 starts to be increased until when the drain current stops to flow (hereinafter, sometimes be referred to as an "off time of the FET switch 1"). Hereinafter, the time period 323 is represented by Tfsw1.

In this case, T2 represents a value obtained by subtracting Tdsw4_ON from the sum of Tdsw1_OFF and Tfsw1. Namely, this can be represented by T2=Tdsw1_OFF+Tfsw1−Tdsw4_ON.

Figure 5:
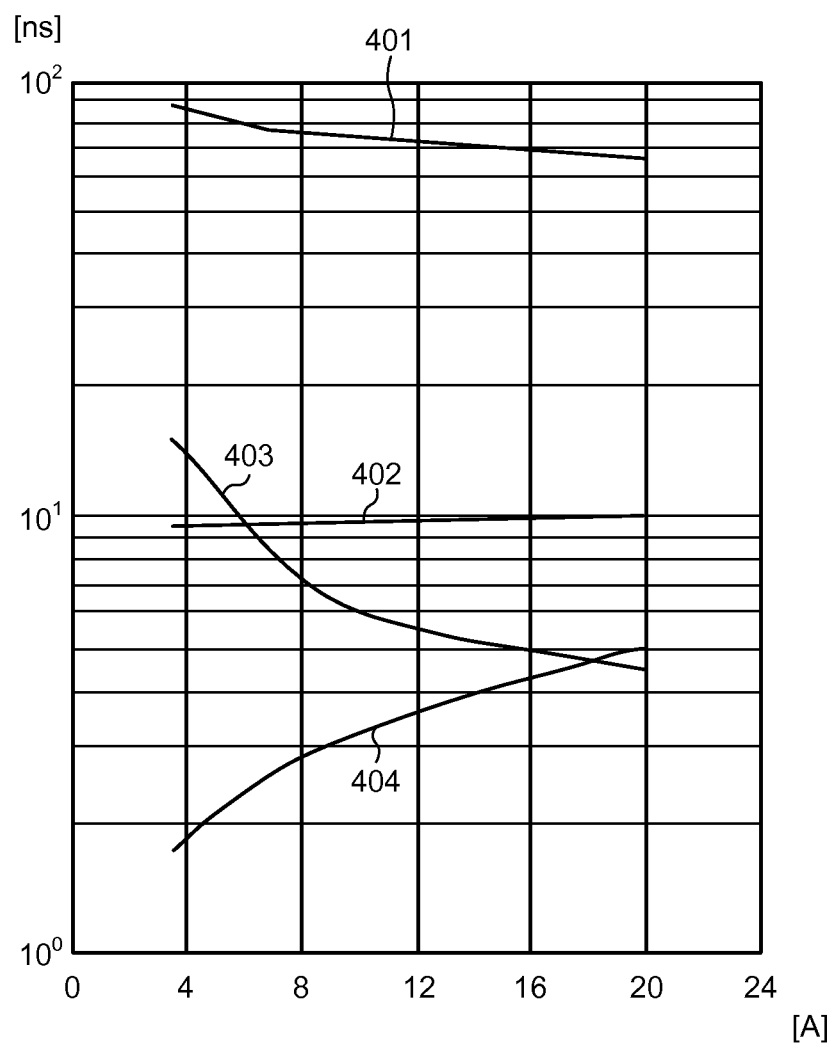
FIG. 5 is a schematic diagram illustrating an example of a data sheet of an FET switch.

Then, an off time, a gate delay of an on state, and a gate delay of an off state of the FET switches 1 and 4 in accordance with a current, i.e., a drain current, that is output from the converter circuit 121 can be previously acquired. For example, each value can be acquired by referring to, for example, a data sheet of FET switches provided from the manufacturer of the FET switches. FIG. 5 is a schematic diagram illustrating an example of a data sheet of an FET switch. In FIG. 5, the vertical axis represents the time and the horizontal axis represents a current. Furthermore, a graph 401 represents a gate delay when the FET switch 1 is turned off. Furthermore, a graph 402 represents a gate delay when the FET switch 1 is turned on. Furthermore, a graph 403 represents an off time of the FET switch 1. Furthermore, a graph 404 represents the duration from when the drain voltage of the FET switch 1 starts to be applied until when the state becomes completely in the on state (on time).

Figures 6, 7:
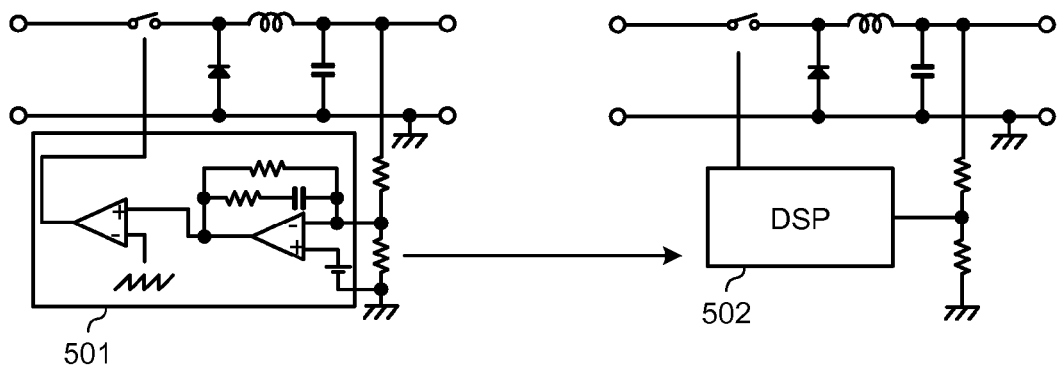
FIG. 6 is a defined value table obtained when a current of 20.7 (A) flows.
FIG. 7 is a schematic diagram illustrating a Duty ratio operation.

From the graphs 401 to 404, it is possible to obtain, at each current value, an off time of the FET switch 1, a gate delay of the FET switch 1 in an on state, and a gate delay of the FET switch 1 in an off state. For example, FIG. 6 is a defined value table obtained when the current of 20.7 (A) flows. By using each value at the time of 20.7 (A) in the graphs 401 to 404 illustrated in FIG. 5, it is possible to create a defined value table 410 that indicates an off time of each the FET switch 1 and the FET switch 4, a gate delay of each of the FET switch 1 and the FET switch 4 in an on state, and a gate delay of an off state of each of the FET switch 1 and the FET switch 4 in an off state when the current of 20.7 (A) flows.

Accordingly, the adjustment time calculating unit 203 previously stores therein a table, such as the defined value table 410 illustrated in FIG. 6 for each current value. Then, by using the stored table, the adjustment time calculating unit 203 obtains the off time, a gate delay of an on state, a gate delay of an off state of each of the FET switch 1 and FET switch 4 in accordance with the output current of the converter circuit 121 received from the current sensor 122. For example, if an output current is 20.7 (A), the adjustment time calculating unit 203 obtains, from the defined value table 410 illustrated in FIG. 6, 4.5 (ns), 10 (ns), and 67 (ns) as the off time, a gate delay of an on state, and a gate delay of an off state, respectively, of each of the FET switches 1 and 4.

Then, the adjustment time calculating unit 203 substitutes the obtained value into T1=Tdsw4_OFF+Tfsw4−Tdsw1_ON and T2=Tdsw1_OFF+Tfsw1−Tdsw4_ON and calculates T1 and T2, respectively.

Thereafter, the adjustment time calculating unit 203 outputs the calculated T1 and T2 to the Duty ratio correcting unit 202.

The Duty ratio operation unit 204 receives the measurement result of the output voltage form the voltage sensor 123.

The Duty ratio operation unit 204 performs A/D conversion on the received voltage value and obtains the digital value of the output voltage. Then, the Duty ratio operation unit 204 calculates a Duty ratio of the output voltage of the converter circuit 121.

FIG. 7 is a schematic diagram illustrating a Duty ratio operation. A digital signal processor (DSP) 502 illustrated in FIG. 7 describes a filter circuit 501 by a formula and uses the formula for an input voltage, thereby the DSP 502 calculates a Duty ratio. For example, the Duty ratio operation unit 204 subtracts the target voltage from the received output voltage. Then, the Duty ratio operation unit 204 performs the same phase compensation filter operation as that performed by the DSP 502, thereby the Duty ratio operation unit 204 obtains a Duty ratio. Then, the Duty ratio operation unit 204 outputs the calculated Duty ratio to the Duty ratio correcting unit 202.

The Duty ratio correcting unit 202 receives the values of T1 and T2 from the adjustment time calculating unit 203. Furthermore, the Duty ratio correcting unit 202 receives the current Duty ratio from the Duty ratio operation unit 204.

The Duty ratio correcting unit 202 multiplies the switching cycle of the FET switch 1 and the FET switch 4 by the received current Duty ratio and calculates the time period during which the gate voltage of the FET switch 1 and the FET switch 4 are in the on state. The time period during which the gate voltage of each of the FET switch 1 and the FET switch 4 is in the on state is represented by "t×Duty". The symbol of t represents a switching cycle and Duty represents the current Duty ratio.

Then, the Duty ratio correcting unit 202 subtracts T1 from t1×Duty and calculates the time period during which the FET switch 1 is turned on. Namely, the Duty ratio correcting unit 202 obtains the time period during which the FET switch 1 is turned on as t×Duty-T1. Furthermore, the Duty ratio correcting unit 202 subtracts T2 from t×Duty and calculates the time period during which the FET switch 4 is turned on. Namely, the Duty ratio correcting unit 202 obtains the time period during which the FET switch 4 is turned on as t×Duty−T2.

Then, the Duty ratio correcting unit 202 sends the time period during which each of the FET switches 1 and 4 is turned on, T1, and T2 to the on/off instruction unit 201.

The on/off instruction unit 201 receives the time period during which each of the FET switches 1 and 4 is turned on, T1, and T2 from the Duty ratio correcting unit 202.

Then, the on/off instruction unit 201 makes the gate voltage of the FET switch 4 in the off state and then makes the gate voltage of each of the FET switches 1 to 3 in the on state after T1 hour has elapsed. Thereafter, when the time period during which the FET switch 1 is to be turned on has elapsed, the on/off instruction unit 201 makes the gate voltage of each of the FET switches 1 to 3 in the off state and then makes the gate voltage of the FET switch 4 in the on state after T2 hour has elapsed. Then, when the time period during which the FET switch 4 is to be turned on has elapsed, the on/off instruction unit 201 makes the gate voltage of the FET switch 4 in the off state. The on/off instruction unit 201 repeatedly performs the switching control described above. Specifically, by outputting a pulse width modulation (PWM) signal in accordance with on/off of the FET switches 1 and 4, the on/off instruction unit 201 controls on/off of the FET switches 1 and 4.

By repeatedly performing this switching control, the switch control unit 200 can minimize a dead time in the converter circuit 121.

Figure 8:
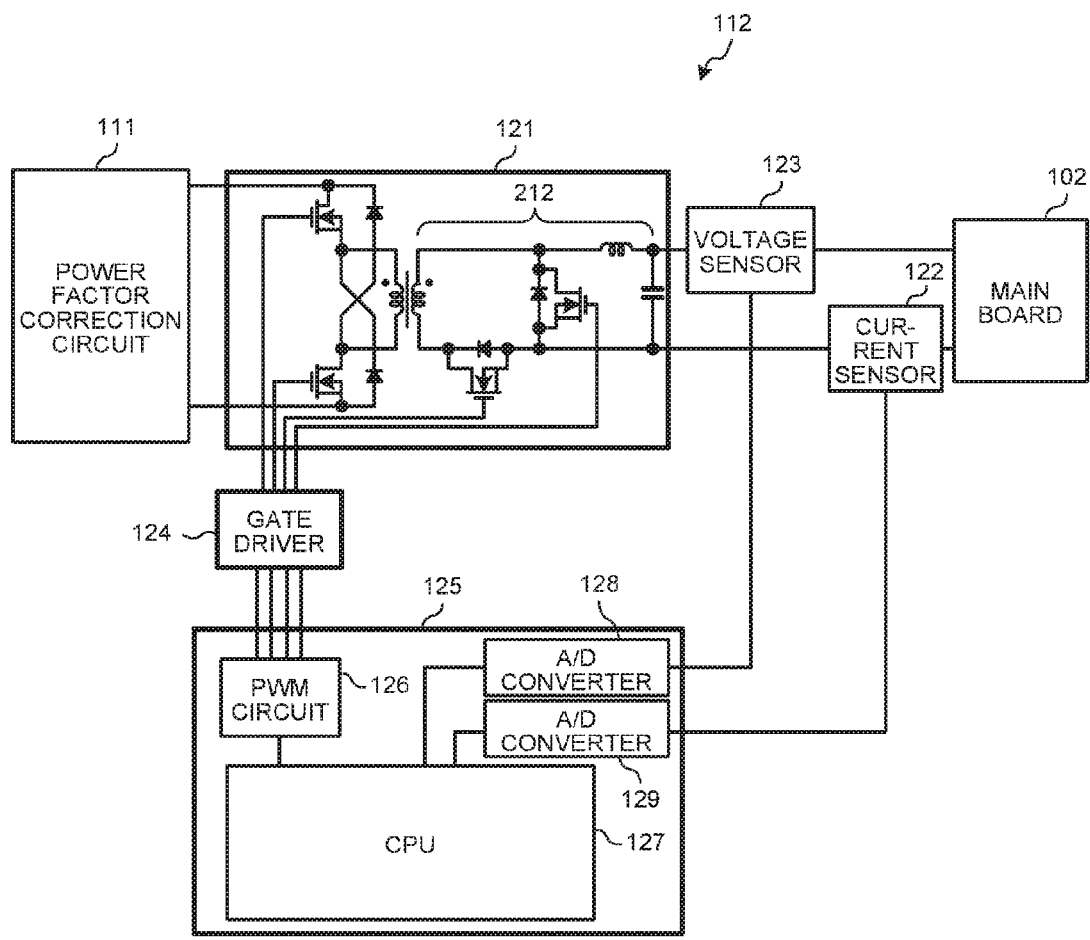
FIG. 8 is a schematic diagram illustrating the hardware configuration of a switch control unit.

The hardware configuration of the switch control unit 200 will be described with reference to FIG. 8. FIG. 8 is a schematic diagram illustrating the hardware configuration of a switch control unit.

As illustrated in FIG. 8, the switch control unit 200 includes a gate driver 124 and an one-chip microcomputer 125. Furthermore, on the one-chip microcomputer 125, an A/D converter 128, an A/D converter 129, a CPU 127, and a PWM circuit 126 are mounted on. Furthermore, FIG. 8 illustrates, as an example, the state in which the main board 102 is connected to the converter circuit 121. In practice, other devices are also similarly connected to the main board 102.

The A/D converter 128 converts the measurement result of the output voltage that has been input from the voltage sensor 123 to a digital signal. Furthermore, the A/D converter 129 converts the measurement result of the output current that has been input from the current sensor 122 to a digital signal.

The CPU 127 obtains the time period during which the FET switch 1 and the FET switch 4 are turned on, T1, and T2 from output current and the output voltage that have been received from the A/D converters 128 and 129.

The PWM circuit 126 sends a PWM signal to the gate driver 124 in accordance with an instruction received from the CPU 127.

The gate driver 124 is connected to the gate voltage input terminals 23, 24, 27, and 28 of the converter circuit 121. In response to the PWM signal from the PWM circuit 126, the gate driver 124 applies a gate voltage to each of the FET switches 1 to 4 via the gate voltage input terminals 23, 24, 27, and 28, respectively.

For example, the A/D converter 129 and the CPU 127 implement the function performed by the adjustment time calculating unit 203 illustrated in FIG. 2. Furthermore, for example, the A/D converter 128 and the CPU 127 implement the function performed by the Duty ratio operation unit 204 illustrated in FIG. 2. Furthermore, for example, the CPU 127 implements the function performed by the Duty ratio correcting unit 202. Furthermore, for example, the CPU 127, the PWM circuit 126, and the gate driver 124 implement the function performed by the on/off instruction unit 201.

Figure 9:
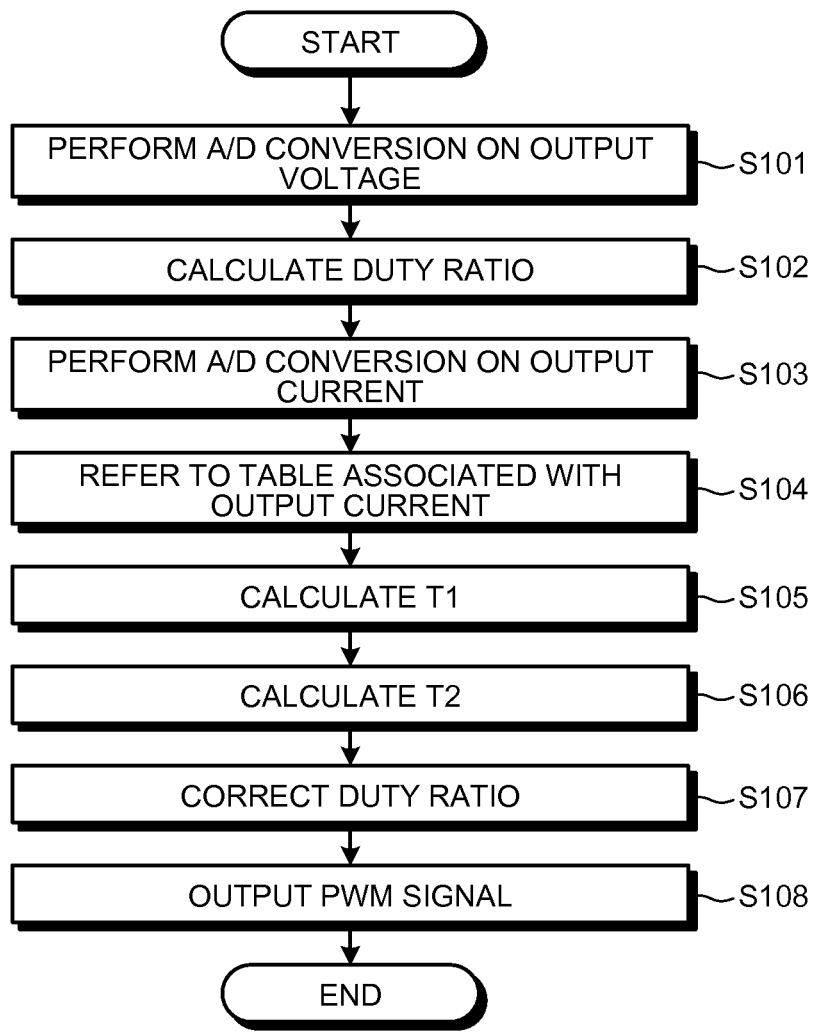
FIG. 9 is a flowchart illustrating the flow of control performed by the DC-DC converter in the power supply device according to the first embodiment.

In the following, the flow of control performed by the DC-DC converter in the power supply device according to the first embodiment will be described with reference to FIG. 9. FIG. 9 is a flowchart illustrating the flow of control performed by the DC-DC converter in the power supply device according to the first embodiment.

The Duty ratio operation unit 204 performs A/D conversion on the output voltage of the converter circuit 121 measured by the voltage sensor 123 (Step S101).

Then, the Duty ratio operation unit 204 calculates the current Duty ratio by using the output voltage that has been converted to digital information (Step S102).

The adjustment time calculating unit 203 performs A/D conversion on the output current of the converter circuit 121 measured by the current sensor 122 (Step S103).

Then, the adjustment time calculating unit 203 refers to the table in which the off time, a gate delay of an on state, a gate delay of an off state of each of the FET switch 1 and FET switch 4 that are associated with the output current that has been converted to the digital information (Step S104).

Then, the adjustment time calculating unit 203 calculates T1 that is the delay time from when the gate voltage of the FET switch 4 is made to the off state until when the gate voltage of the FET switch 1 is made to the on state (Step S105).

Then, the adjustment time calculating unit 203 calculates T2 that is the delay time from when the gate voltage of the FET switch 1 is turned off until when the gate voltage of the FET switch 4 is turned on (Step S106).

The Duty ratio correcting unit 202 receives the inputs of T1 and T2 from the adjustment time calculating unit 203. Furthermore, the Duty ratio correcting unit 202 receives an input of the current Duty ratio from the Duty ratio operation unit 204. Then, the Duty ratio correcting unit 202 corrects the Duty ratio of each of the FET switches 1 and 4 (Step S107). Specifically, the Duty ratio correcting unit 202 obtains the time during which the FET switch 1 is turned on as t×Duty−T1. Furthermore, the Duty ratio correcting unit 202 obtains the time during which the FET switch 4 is turned on as t×Duty−T4.

The on/off instruction unit 201 receives the inputs of the time period during which the FET switches 1 and 4 are turned on, T1, and T2 from the Duty ratio correcting unit 202. Then, the on/off instruction unit 201 outputs a PWM signal in accordance with the time period during which the FET switches 1 and 4 are turned on, T1, and T2 (Step S108). The control of on/off of the FET switches 1 to 4 is performed at the timing of the PWM signal.

Here, in FIG. 9, for convenience of explanation, a description has been given of a case in which the processes at Steps S101 and S102 are performed by the Duty ratio operation unit 204 and then the processes at Steps S103 to S106 are performed by the adjustment time calculating unit 203; however, these processes may also be performed in parallel.

(Modification)

In the first embodiment, the adjustment time calculating unit 203 calculates T1 and T2 by using the table that is created from data sheets of the FET switches. In contrast, a modification differs from the first embodiment in that T1 and T2 are obtained by using simulation program with integrated circuit emphasis (SPICE) simulation and then control is performed by using these values. In a description below, an operation of the adjustment time calculating unit 203 will be described and descriptions of the other units will be omitted because they have the same functions and operations.

Figure 10:
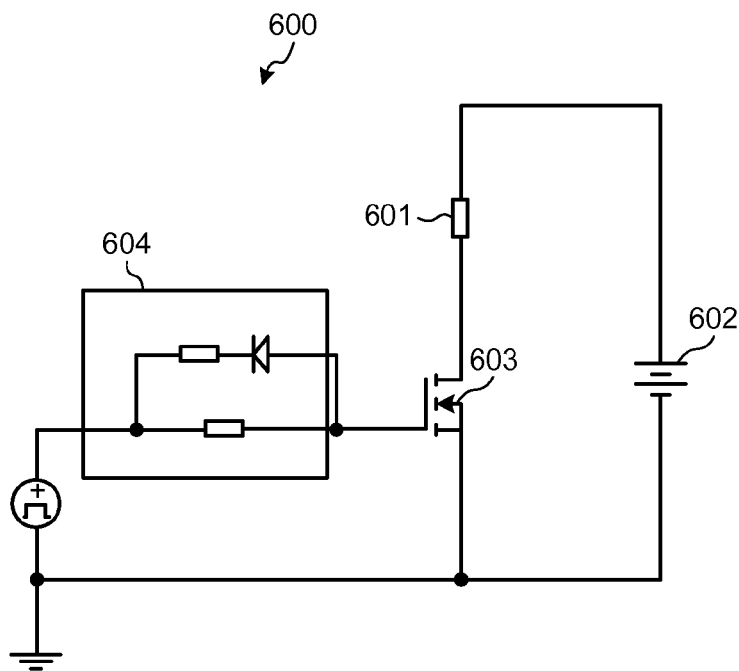
FIG. 10 is a circuit diagram of a simulation circuit.

FIG. 10 is a circuit diagram of a simulation circuit. A simulation circuit 600 illustrated in FIG. 10 is the simulation circuit equivalent to the FET switch 1. A resistance 601 is a resistance that is used to change a drain current. By changing a resistance value of the resistance 601, a drain current is changed. A power supply 602 is an input power supply of 400 V. A switch 603 is the FET switch 1. A gate drive circuit 604 is formed in accordance with a circuit that is actually used.

Figure 11:
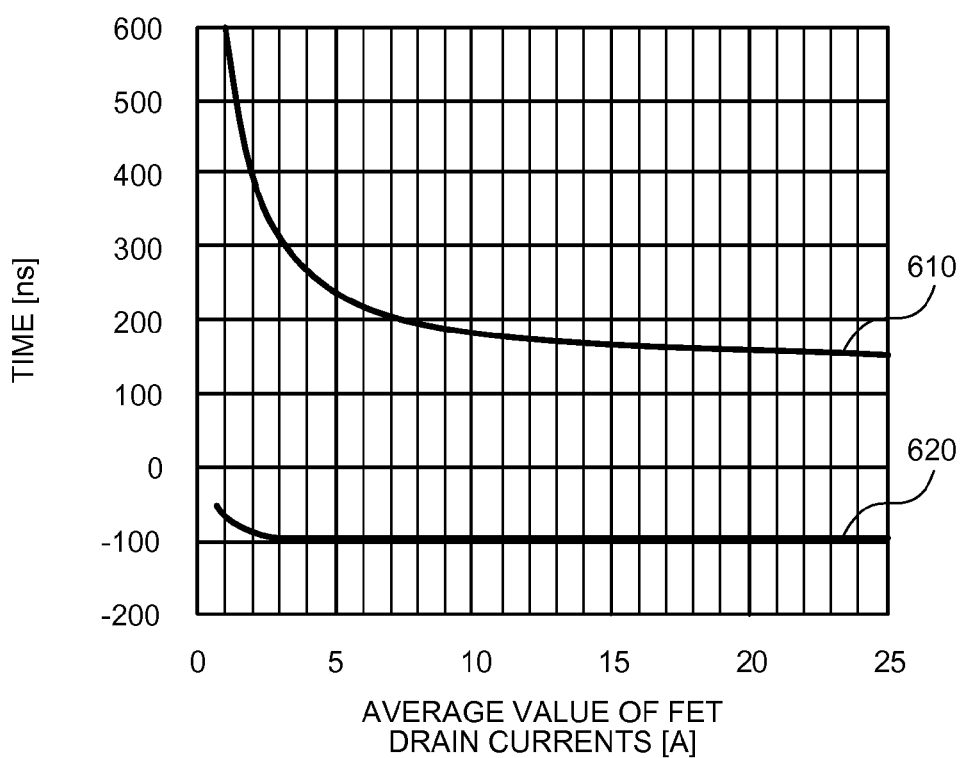
FIG. 11 is a schematic diagram illustrating the result of a SPICE simulation.

In order to simulate the FET switch 1 and the FET switch 4, simulation is performed, in practice, by using a circuit in which two simulation circuits 600 are arranged in parallel. Then, the time indicated by T1 and the time indicated by T2 associated with the respective drain currents are obtained. FIG. 11 is a schematic diagram illustrating the result of a SPICE simulation. In FIG. 11, the vertical axis represents the time and the horizontal axis represents the average value of the drain currents of the FET switches. The time T1 obtained by using the simulation circuit 600 illustrated in FIG. 10 is indicated by a graph 610 the time T2 obtained by using the simulation circuit 600 is indicated by a graph 620.

In this way, T1 and T2 associated with the respective drain currents that are previously obtained by performing the SPICE simulation are stored in the adjustment time calculating unit 203. For example, the adjustment time calculating unit 203 previously stores therein graphs 610a and 620 illustrated in FIG. 11.

The adjustment time calculating unit 203 acquires T1 and T2 associated with the received output current from the graphs 610 and 620. Then, the adjustment time calculating unit 203 outputs the obtained T1 and T2 to the Duty ratio correcting unit 202.

In this way, by using the SPICE simulation, the accuracy of T1 and T2 can be improved and thus the dead time can further be reduced.

Figure 12:
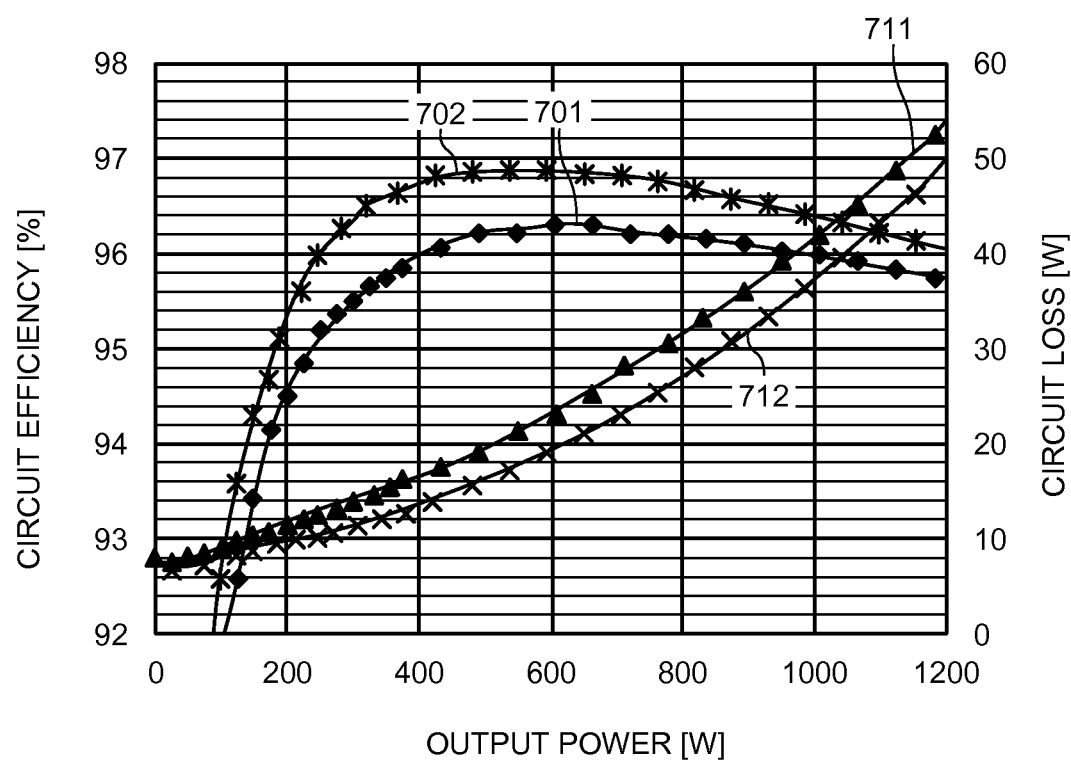
FIG. 12 is a schematic diagram illustrating the comparison of efficiency and loss between power supply device according to a modification and a conventional power supply device.

FIG. 12 is a schematic diagram illustrating the comparison of efficiency and loss between power supply device according to a modification and a conventional power supply device. FIG. 12 illustrates a case in which the DC-DC converter 112 is a converter for an input of 400 V and an output of 12 V. In FIG. 12, the vertical axis illustrated on the left side represents circuit efficiency and the vertical axis illustrated on the right side represents a loss of the circuit. Furthermore, in FIG. 12, the horizontal axis represents the output power of the DC-DC converter 112.

A graph 701 is a graph that represents the circuit efficiency obtained when a conventional power supply device is used. Furthermore, a graph 702 is a graph that represents the circuit efficiency obtained when a power supply device according to the modification is used. The graph 702 maintains the value higher than that indicated by the graph 701, which indicates that the efficiency of the power supply device according to the modification is increased when compared with the conventional power supply device.

A graph 711 is a graph that represents a loss of a circuit when the conventional power supply device is used. Furthermore, a graph 712 is a graph that represents a loss of a circuit when the power supply device according to the modification is used. The graph 712 maintains the value higher than that indicated by the graph 711, which indicates that the loss in the power supply device according to the modification is lower than that in the conventional power supply device.

Here, in the modification, simulation is performed by using the SPICE simulation; however, the simulation method is not limited thereto and another method may also be used as long as the operation of a FET switch in a converter circuit can be simulated.

As described above, the power supply device according to the first embodiment and the modification controls on/off of the FET switches such that a dead time is reduced in accordance with an output current, i.e., a drain current of each of the FET switches. Consequently, it is possible to control the FET switches in accordance with the dead time that is changed due to a change in the drain current and thus the dead time can be shortened regardless of the magnitude of the drain current. Namely, with the power supply device according to the first embodiment and the modification, the energy loss during the dead time can be minimized.

Furthermore, as described in the modification, by using the SPICE simulation, the accuracy of the timing at which the FET switches are turned on or off can be enhanced and thus the dead time can be further shortened.

[b] Second Embodiment

Figure 13:
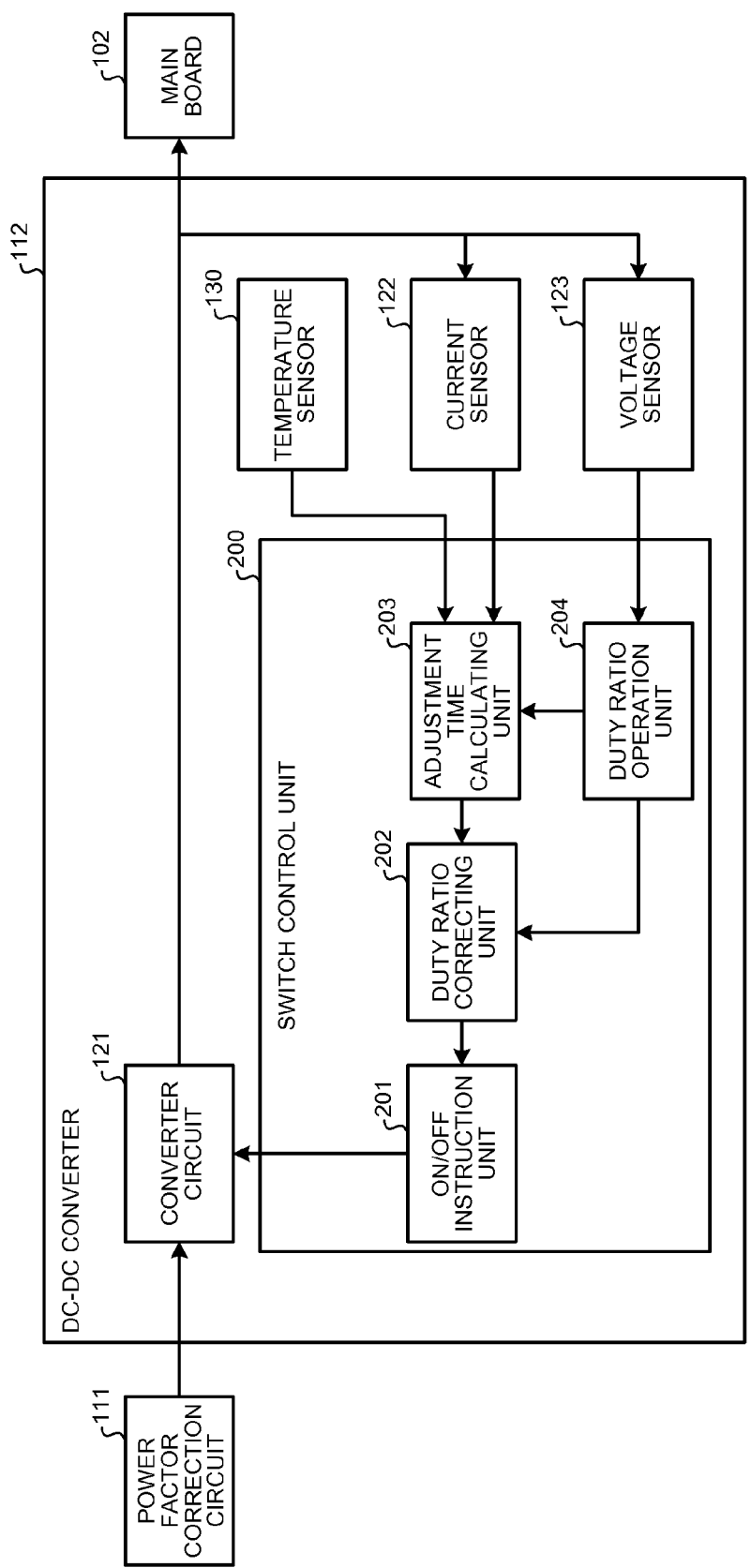
FIG. 13 is a block diagram illustrating a DC-DC converter according to a second embodiment.

FIG. 13 is a block diagram illustrating a DC-DC converter according to a second embodiment. A power supply device according to a second embodiment differs from the first embodiment in that on/off of the FET switches are controlled by taking into consideration a change in the operation of the FET switches due to a change in temperature. In a description below, components having the same function as that performed in the first embodiment will not described.

In the power supply device according to the second embodiment, a temperature sensor 130 is further added to the power supply device in the first embodiment illustrated in FIG. 2.

The temperature sensor 130 is arranged at the position in which the temperature of each of the FET switches 1 to 4 can be measured. For example, the temperature sensor 130 is arranged in the vicinity of the FET switch 4 and measures the temperature of the FET switch 4 and, similarly, measures the temperature of each of the FET switches 1 to 3.

The temperature sensor 130 notifies the adjustment time calculating unit 203 of the measured temperature of each of the FET switches 1 to 4.

The adjustment time calculating unit 203 stores therein a table that indicates, for each combination of the temperature and the output current, the off time, a gate delay of an on state, a gate delay of an off state of each of the FET switch 1 and FET switch 4.

The adjustment time calculating unit 203 receives, from the current sensor 122, an input of the measurement result of the output current of the converter circuit 121. Then, the adjustment time calculating unit 203 performs A/D conversion on the value of the received output current and obtains the digital value of the output current. Furthermore, the adjustment time calculating unit 203 receives an input of the measurement result of the temperature of each of the FET switches 1 to 4 from the temperature sensor 130.

The adjustment time calculating unit 203 obtains the off time, a gate delay of an on state, a gate delay of an off state of each of the FET switch 1 and FET switch 4 from the table associated with the received output current and the temperature. Then, the adjustment time calculating unit 203 calculates T1 and T2 from the off time, a gate delay of an on state, a gate delay of an off state of each of the FET switch 1 and FET switch 4.

Then, the adjustment time calculating unit 203 outputs the calculated T1 and T2 to the Duty ratio correcting unit 202.

In the second embodiment, T1 and T2 are calculated on the basis of the values acquired by using the table; however, the embodiment is not limited thereto. For example, as in the modification according to the first embodiment, T1 and T2 may also be obtained by performing the SPICE simulation in accordance with the temperature and the drain current.

Figure 14:
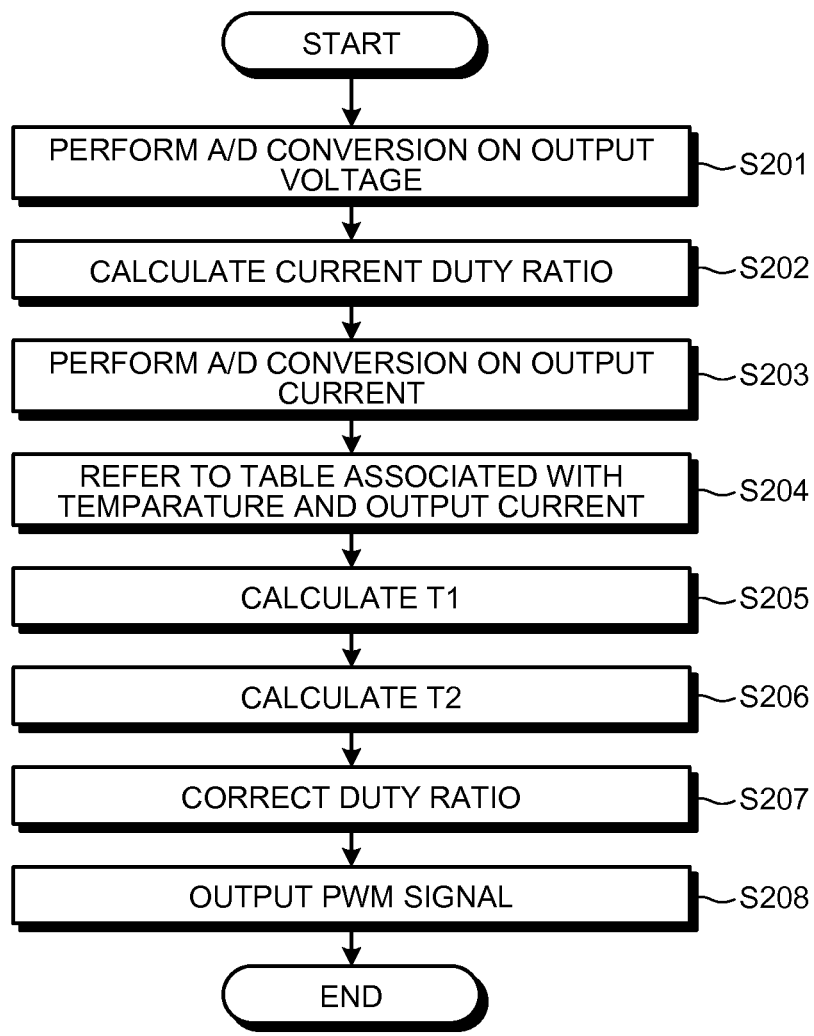
FIG. 14 is a flowchart illustrating the flow of control performed by the DC-DC converter in a power supply device according to a second embodiment.

In the following, the flow of the control of the DC-DC converter in the power supply device according to the second embodiment will be described with reference to FIG. 14. FIG. 14 is a flowchart illustrating the flow of control performed by the DC-DC converter in a power supply device according to the second embodiment.

The Duty ratio operation unit 204 performs A/D conversion on the output voltage of the converter circuit 121 measured by the voltage sensor 123 (Step S201).

Then, the Duty ratio operation unit 204 calculates the current Duty ratio by using the output voltage that has been converted into digital information (Step S202).

The adjustment time calculating unit 203 performs A/D conversion on the output current of the converter circuit 121 measured by the current sensor 122 (Step S203).

Furthermore, the adjustment time calculating unit 203 receives the measurement result of the temperature of each of the FET switches 1 to 4 from the temperature sensor 130. Then, the adjustment time calculating unit 203 refers to the table that stores therein the off time, a gate delay of an on state, a gate delay of an off state of each of the FET switch 1 and FET switch 4 associated with the output current and the temperature (Step S204).

Then, the adjustment time calculating unit 203 calculates T1 that is the delay time from when the gate voltage of the FET switch 4 is made to the off state until when the gate voltage of the FET switch 1 is made to the on state (Step S205).

Then, the adjustment time calculating unit 203 calculates T2 that is the delay time from when the gate voltage of the FET switch 1 is made to the off state until when the gate voltage of the FET switch 4 is made to the on state (Step S206).

The Duty ratio correcting unit 202 receives the inputs of T1 and T2 from the adjustment time calculating unit 203. Furthermore, the Duty ratio correcting unit 202 receives an input of the current Duty ratio from the Duty ratio operation unit 204. Then, the Duty ratio correcting unit 202 corrects the Duty ratio of each of the FET switches 1 and 4 (Step S207).

The on/off instruction unit 201 receives the input of the time period during which each of the FET switches 1 and 4 are turned on and the inputs of T1 and T2 from the Duty ratio correcting unit 202. Then, the on/off instruction unit 201 outputs a PWM signal in accordance with the time period during which each of the FET switches 1 and 4 are turned on, T1, and T2 (Step S208). The control of on/off of each of the FET switches 1 to 4 is performed at the timing of this PWM signal.

Here, in FIG. 14, for convenience of explanation, description has been given of a case in which the processes at Steps S201 and S202 are performed by the Duty ratio operation unit 204 and then the processes at Steps S203 to S206 are performed by the adjustment time calculating unit 203; however, the processes may also be performed in parallel.

As described above, the power supply device according to the second embodiment adjusts the timing at which each of the FET switches 1 and 4 are turned on or off in accordance with the temperature and the drain current pf each of the FET switches. Consequently, a dead time can be shortened regardless of a change in the temperature and the drain current of the FET switches.

[c] Third Embodiment

Figure 15:
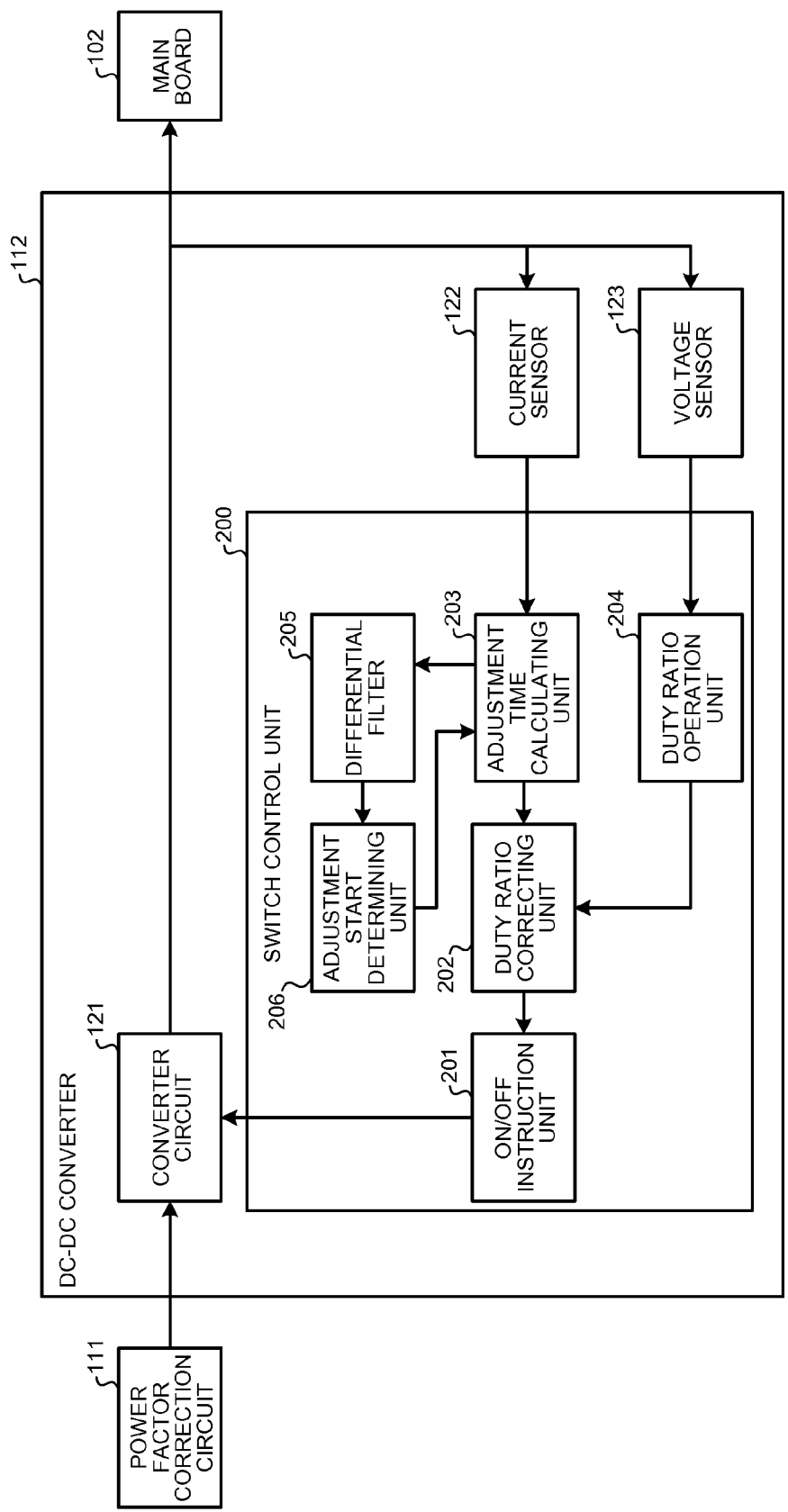
FIG. 15 is a block diagram illustrating a DC-DC converter according to a third embodiment.

FIG. 15 is a block diagram illustrating a DC-DC converter according to a third embodiment. A power supply device according to the third embodiment differs from the first embodiment in that, in addition to the periodical adjustment of the timing at which each of the FET switches are turned on or off, the timing at which each of the FET switches are turned on or off may also be adjusted when a change in the current is great. In a description below, components having the same function as that performed in the first embodiment will not described.

In the power supply device according to the third embodiment, a differential filter 205 and an adjustment start determining unit 206 are further added to the power supply device according to the first embodiment illustrated in FIG. 2.

The current sensor 122 outputs the measurement result of the output current of the converter circuit 121 to the adjustment time calculating unit 203 and the differential filter 205. Here, in the third embodiment, the current sensor 122 outputs the measurement result of the output current at a timing when a single cycle of the switching of the FET switches 1 to 4 has been ended.

The differential filter 205 receives, from the adjustment time calculating unit 203, an input of the value obtained by performing A/D conversion on the measurement result of the output current of the converter circuit 121. Then, the differential filter 205 differentiates the output current. Then, the differential filter 205 outputs the differentiation result of the output current to the adjustment start determining unit 206.

The adjustment start determining unit 206 stores therein a threshold that is used to determine whether a great change in the current occurs. Furthermore, the adjustment start determining unit 206 includes a counter. The counter in the adjustment start determining unit 206 is set to zero when, for example, the server 100 (see FIG. 1) is booted up. Furthermore, the adjustment start determining unit 206 stores therein the upper limit N for the counter.

The adjustment start determining unit 206 receives, from the differential filter 205, an input of the differentiation result of the output current. Then, the adjustment start determining unit 206 determines whether the received differentiation result exceeds the threshold. If the received differentiation result does not exceed the threshold, the adjustment start determining unit 206 increments the counter by 1. Then, when the counter reaches N, the adjustment start determining unit 206 instructs the adjustment time calculating unit 203 to calculate T1 and T2. Thereafter, the adjustment start determining unit 206 resets the counter to zero. Here, the upper limit N of the counter preferably be set depending on the allowable degree of the occurrence of the dead time. Namely, if the occurrence of the dead time needs to be suppressed, N is preferably small, whereas, if the occurrence of the dead time can be allowed to some extent, N can be great.

In contrast, if the differentiation result of the output current exceeds the threshold, the adjustment start determining unit 206 instructs the adjustment time calculating unit 203 to calculate T1 and T2. Then, the adjustment start determining unit 206 resets the counter to zero.

The adjustment time calculating unit 203 outputs the value that is obtained by performing A/D conversion on the received measurement result of the output current to the differential filter 205.

Thereafter, when the adjustment time calculating unit 203 receives the instruction to calculate T1 and T2 from the adjustment start determining unit 206, the adjustment time calculating unit 203 calculates T1 and T2 by using the output current received from the current sensor 122. Then, the adjustment time calculating unit 203 outputs the obtained T1 and T2 to the Duty ratio correcting unit 202.

Here, for the start of the adjustment of on/off of the FET switches 1 to 4 in accordance with the differentiation, specifically, the control routine is operated by detecting, at the differential circuit, the moment when the current is promptly changed and by allowing the one-chip microcomputer 125 illustrated in FIG. 8 to perform an interruption.

Figure 16:
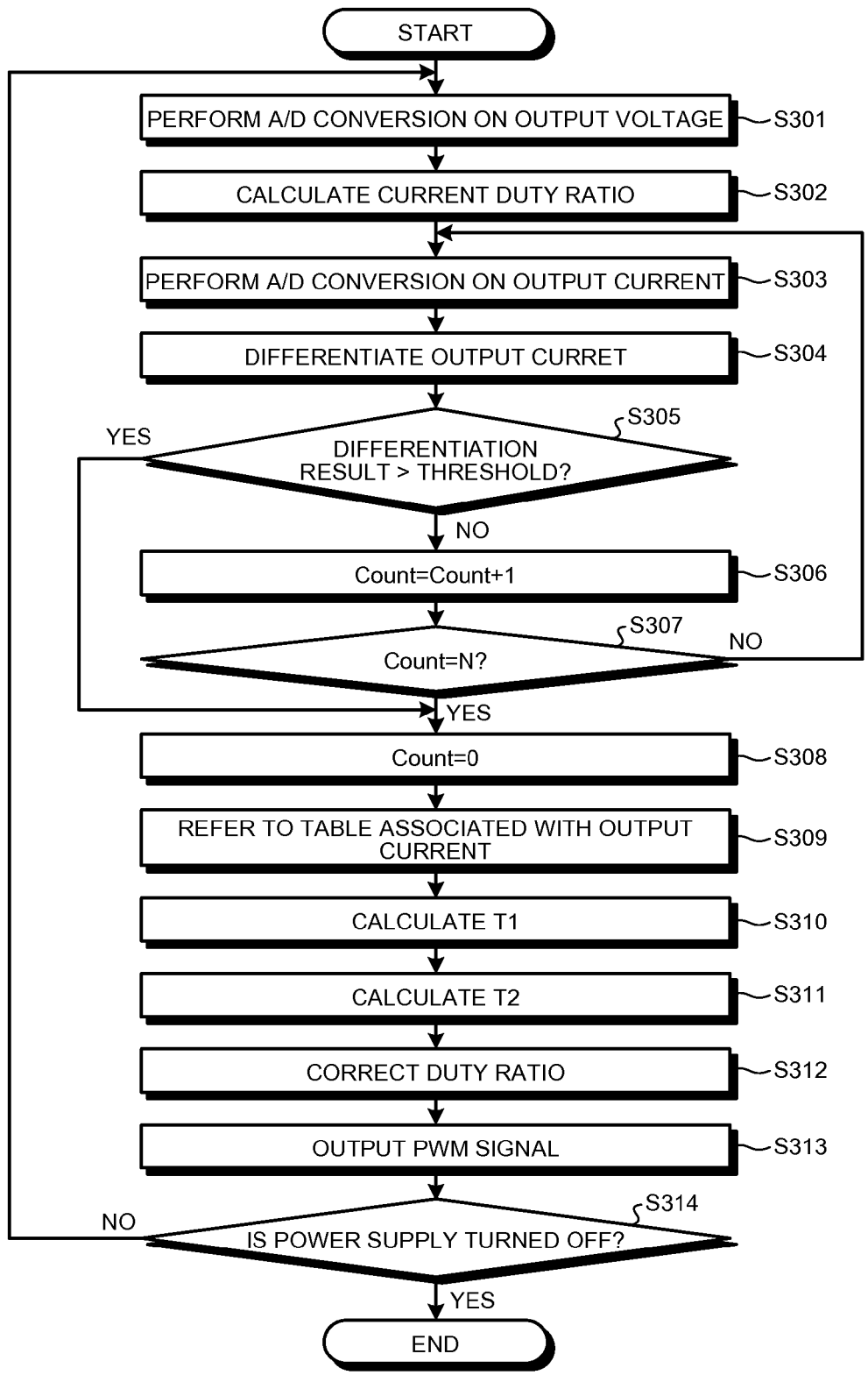
FIG. 16 is a flowchart illustrating the flow of control performed by the DC-DC converter in a power supply device according to the third embodiment.
Figure 17:
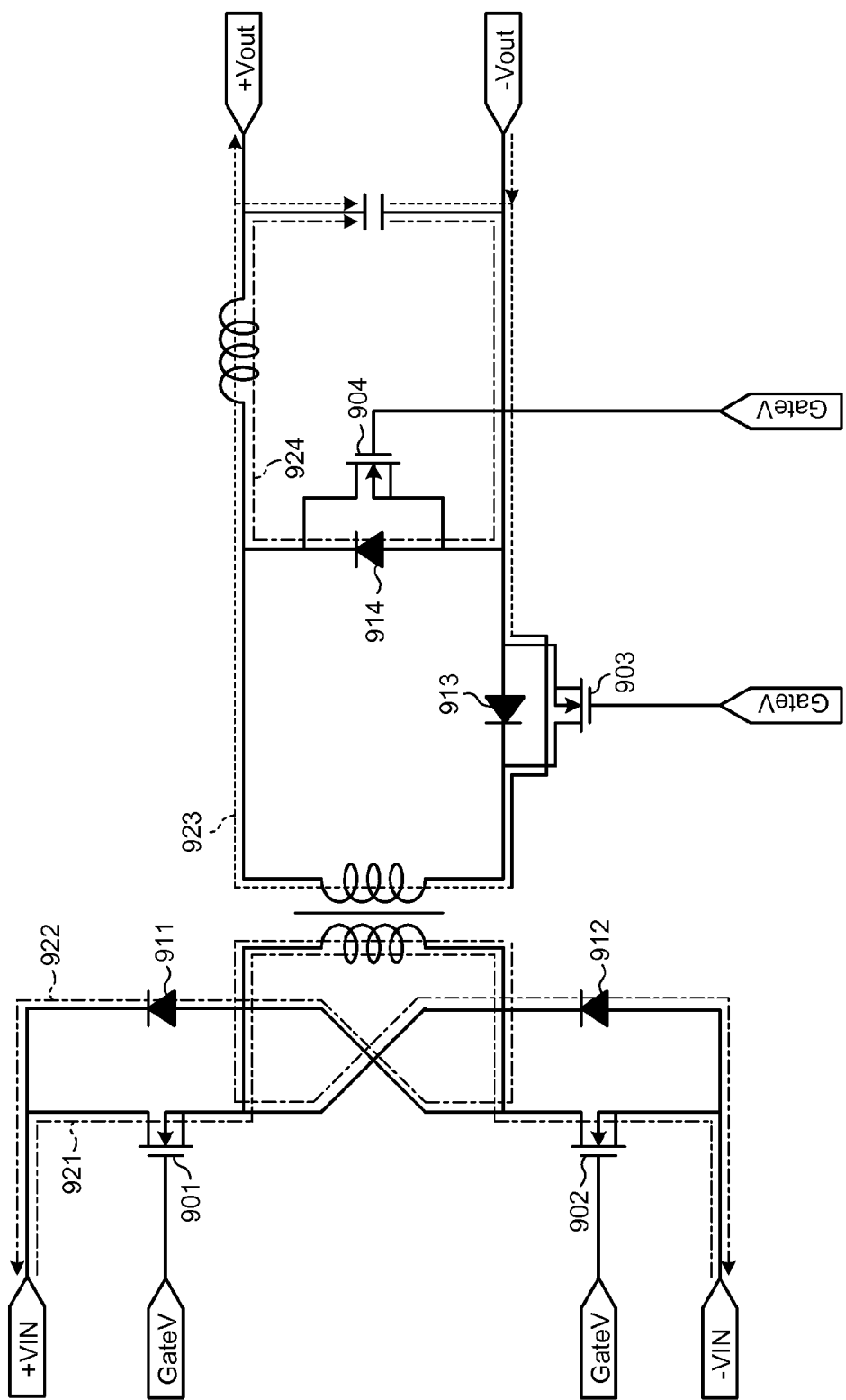
FIG. 17 is a schematic diagram illustrating an example of a double ended forward circuit.
Figure 18:
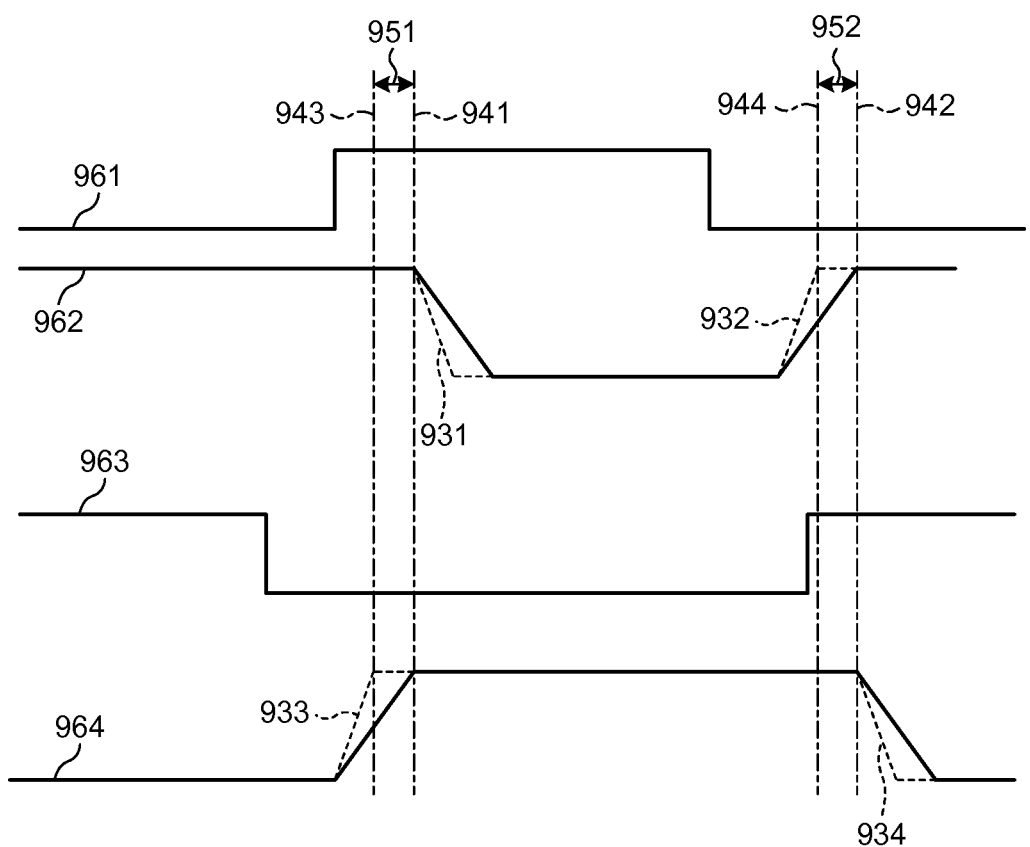
FIG. 18 is a schematic diagram illustrating expansion of dead time when a high current flows.

In the following, the flow of the control of the DC-DC converter in the power supply device according to the third embodiment will be described with reference to FIG. 16. FIG. 16 is a flowchart illustrating the flow of control performed by the DC-DC converter in a power supply device according to the third embodiment.

The Duty ratio operation unit 204 performs A/D conversion on the output voltage of the converter circuit 121 measured by the voltage sensor 123 (Step S301).

Then, the Duty ratio operation unit 204 calculates the current Duty ratio by using the output voltage that has been converted to digital information (Step S302).

The adjustment time calculating unit 203 performs A/D conversion on the output current of the converter circuit 121 measured by the current sensor 122 (Step S303).

The differential filter 205 receives the value of the output current from the adjustment time calculating unit 203. Then, the differential filter 205 differentiates the output current (Step S304). Then, the differential filter 205 outputs the differentiation result of the output current to the adjustment start determining unit 206.

The adjustment start determining unit 206 receives an input of the differentiation result of the output current from the differential filter. Then, the adjustment start determining unit 206 determines whether the differentiation result exceeds the threshold (Step S305). If the differentiation result exceeds the threshold (Yes at Step S305), the adjustment start determining unit 206 proceeds to Step S308.

In contrast, if the differentiation result is less than the threshold (No at Step S305), the adjustment start determining unit 206 increments the value of the own counter by one, i.e., Count=Count+1 (Step S306). Here, "Count" indicates the value of the counter of the adjustment start determining unit 206.

Then, the adjustment start determining unit 206 determines whether the own counter reaches the upper limit N (Count=N) (Step S307). If the own counter does not reach the upper limit N (No at Step S307), the process returns to Step S303.

In contrast, if the counter reaches the upper limit N (Yes at Step S307), the adjustment start determining unit 206 resets the own counter to zero (Count=0) (Step S308). Then, the adjustment start determining unit 206 instructs the adjustment time calculating unit 203 to calculate T1 and T2.

Thereafter, the adjustment time calculating unit 203 receives the instruction from the adjustment start determining unit 206 indicating that the adjustment time of T1 and T2 needs to be calculated, the adjustment time calculating unit 203 refers to the table associated with the output current that has been converted to the digital information (Step S309).

Then, the adjustment time calculating unit 203 calculates T1 that is the delay time from when the gate voltage of the FET switch 4 is made to the off state until when the gate voltage of the FET switch 1 is made to the on state (Step S310).

Thereafter, the adjustment time calculating unit 203 calculates T2 that is the delay time from when the gate voltage of the FET switch 1 is made to off state until when the gate voltage of the FET switch 4 is made to the on state (Step S311).

The Duty ratio correcting unit 202 receives the inputs of T1 and T2 from the adjustment time calculating unit 203. Furthermore, the Duty ratio correcting unit 202 receives an input of the current Duty ratio from the Duty ratio operation unit 204. Then, the Duty ratio correcting unit 202 corrects the Duty ratio of each of the FET switches 1 and 4 (Step S312).

The on/off instruction unit 201 receives inputs of the time period during which the FET switches 1 and 4 are turned on, T1, and T2 from the Duty ratio correcting unit 202. Then, the on/off instruction unit 201 outputs a PWM signal in accordance with the time period during which the FET switches 1 and 4 are turned on, T1, and T2 (Step S313). The control of on/off of each of the FET switches 1 to 4 is performed at the timing of the PWM signal.

The switch control unit 200 determines whether the power supply of the server 100 is turned off (Step S314). If the power supply is not turned off (No at Step S314), the switch control unit 200 returns to Step S301. In contrast, if the power supply is turned off (Yes at Step S314), the switch control unit 200 ends the operation.

Here, in FIG. 16, for convenience of explanation, description has been given of a case in which the processes at Steps S301 to S302 are performed by the Duty ratio operation unit 204 and then the processes at Steps S303 to S311 are performed by the adjustment time calculating unit 203, the differential filter 205, and the adjustment start determining unit 206; however, these processes may also be performed in parallel.

Furthermore, in the third embodiment, the control of on/off of the FET switches is cyclically adjusted; however, by not setting the upper limit N, on/off of the FET switches may also be adjusted only when a change in the current is great.

As described above, the power supply device according to the third embodiment cyclically adjusts the on/off timing of each of the FET switches when a change in the current is great. Consequently, it is possible to cope with the case in which a change in the current is great and a dead time is significantly long; therefore, the number of times of the cyclical adjustment of on/off timing of the FET switches can be reduced. Thus, it is possible to reduce the electrical power consumption of the DC-DC converter when a change in the current is small.

According to an aspect of an embodiment of the power supply device and the control method of the power supply device disclosed in the present invention, an advantage is provided in that a loss of energy can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power supply device comprising:
   a first switching device that controls supply of electricity from an external power supply to a primary winding of a transformer;
   a capacitor that is connected, in series, to a secondary winding of the transformer;
   a second switching device that is connected, in parallel, to the secondary winding and the capacitor;
   a rectifying device that is connected, in parallel, to the second switching device; and
   a switch control unit that acquires a value obtained by measuring a current flowing through the second switching device, obtains, from a measurement result of the current, a first time period from when an off signal is sent to the second switching device until when an on signal is sent to the first switching device and a second time period from when an off signal is sent to the first switching device until when an on signal is sent to the second switching device and that controls, according to the first time period and the second time period, conduction of the first switching device and the second switching device.

2. The power supply device according to claim 1, wherein the switch control unit performs the control such that a drain voltage of the first switching device starts to be applied at a timing when a drain voltage of the second switching device stops being applied and a drain voltage of the second switching device starts to be applied at a timing when a drain voltage of the first switching device stops being applied.

3. The power supply device according to claim 1, wherein the switch control unit previously stores the relationship between the current and an operation of each of the first switching device and the second switching device, acquires the operation of the first switching device and the second switching device associated with the measurement result of the current, and controls the conduction of the first switching device the second switching device according to the acquired operation.

4. The power supply device according to claim 1, wherein the first switching device includes two switching devices.

5. The power supply device according to claim 1, wherein, after the switch control unit sends an off signal to the second switching device, the switch control unit sends an on signal to the first switching device after an elapsed time that is obtained by subtracting a gate delay time of the first switching device in an on state from a sum result of a gate delay time of the second switching device in an off state and the time from when the drain voltage of the second switching device starts to change until when the drain current of the second switching device stops flowing.

6. The power supply device according to claim 1, wherein, after the switch control unit sends an off signal to the first switching device, the switch control unit sends an on signal to the second switching device after an elapsed time that is obtained by subtracting a gate delay time of the second switching device in an on state from a sum result of a gate delay time of the first switching device in an off state and the time from when the drain voltage of the first switching device starts to change until when the drain current of the first switching device stops flowing.

7. The power supply device according to claim 1, further comprising:
a current sensor that measures a current output from the secondary winding; and
a voltage sensor that measures a voltage output from the secondary winding, wherein
the switch control unit includes
a Duty ratio calculating unit that calculates a Duty ratio according to a measurement result obtained by the voltage sensor,
an adjustment time calculating unit that acquires a value of the current measured by the current sensor and that obtains, from the measurement result of the current, a first time period from when an off signal is sent to the second switching device until when an on signal is sent to the first switching device and a second time period from when an off signal is sent to the first switching device until when an on signal is sent to the second switching device,
a Duty ratio correcting unit that corrects the Duty ratio according to the first time period and the second time period, and
a voltage applying unit that applies, according to the Duty ratio corrected by the Duty ratio correcting unit, a voltage to the first switching device and the second switching device.

8. The power supply device according to claim 1, further comprising a temperature sensor that measures the temperature of the second switching device, wherein
the switch control unit previously stores, for each temperature, the relationship between the current and the operation of each of the first switching device and the second switching device, acquires the operation of each of the first switching device and the second switching device according to the temperature measured by the temperature sensor and the measurement result of the current, and controls the conduction of the first switching device and the second switching device.

9. The power supply device according to claim 1, wherein the switch control unit controls, for each predetermined time, a timing when each of the first switching device and the second switching device is turned on or off.

10. The power supply device according to claim 9, wherein the switch control unit obtains a change in a current and controls, when, in addition to the each predetermined time, the change is greater than a predetermined value, the timing when each of the first switching device and the second switching device is turned on or off.

11. A control method of a power supply device that includes a first switching device that controls supply of electricity from an external power supply to a primary winding of a transformer, a capacitor that is connected in series to a secondary winding of the transformer, a second switching device that is connected in parallel to the secondary winding and the capacitor, and a rectifying device that is connected in parallel to the second switching device, the control method comprising:
measuring a current flowing through the second switching device;
obtaining, from a measurement result of the current, a first time period from when an off signal is sent to the second switching device until when an on signal is sent to the first switching device and a second time period from when an off signal is sent to the first switching device until when an on signal is sent to the second switching device; and
controlling, according to the first time period and the second time period, conduction of the first switching device and the second switching device.

* * * * *